US010694357B2

(12) United States Patent
Newman

(10) Patent No.: US 10,694,357 B2
(45) Date of Patent: Jun. 23, 2020

(54) USING VEHICLE SENSOR DATA TO MONITOR PEDESTRIAN HEALTH

(71) Applicant: NIO USA, Inc., San Jose, CA (US)

(72) Inventor: Austin Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 123 days.

(21) Appl. No.: 15/366,623

(22) Filed: Dec. 1, 2016

(65) Prior Publication Data

US 2018/0137372 A1 May 17, 2018

Related U.S. Application Data

(60) Provisional application No. 62/420,985, filed on Nov. 11, 2016.

(51) Int. Cl.
| | |
|---|---|
| *H04W 4/80* | (2018.01) |
| *G06K 9/00* | (2006.01) |
| *H04N 7/18* | (2006.01) |
| *G06K 9/20* | (2006.01) |
| *H04N 5/14* | (2006.01) |

(52) U.S. Cl.
CPC .......... *H04W 4/80* (2018.02); *G06K 9/00369* (2013.01); *G06K 9/2018* (2013.01); *H04N 7/183* (2013.01); *H04N 5/144* (2013.01)

(58) Field of Classification Search
CPC .. G06K 9/00369; G06K 9/2018; H04N 5/144; H04N 7/183; H04W 4/80
See application file for complete search history.

(56) References Cited

U.S. PATENT DOCUMENTS

| | | |
|---|---|---|
| 4,361,202 A | 11/1982 | Minovitch |
| 4,476,954 A | 10/1984 | Johnson et al. |
| 4,754,255 A | 6/1988 | Sanders et al. |
| 4,875,391 A | 10/1989 | Leising et al. |
| 5,136,498 A | 8/1992 | McLaughlin et al. |
| 5,204,817 A | 4/1993 | Yoshida |
| 5,363,306 A | 11/1994 | Kuwahara et al. |
| 5,508,689 A | 4/1996 | Rado et al. |
| 5,521,815 A | 5/1996 | Rose |
| 5,529,138 A | 6/1996 | Shaw et al. |
| 5,531,122 A | 7/1996 | Chatham et al. |
| 5,572,450 A | 11/1996 | Worthy |
| 5,610,821 A | 3/1997 | Gazis et al. |
| 5,648,769 A | 7/1997 | Sato et al. |
| 5,666,157 A | 9/1997 | Aviv |

(Continued)

FOREIGN PATENT DOCUMENTS

| | | |
|---|---|---|
| CN | 1417755 | 5/2003 |
| CN | 1847817 | 10/2006 |

(Continued)

OTHER PUBLICATIONS

U.S. Appl. No. 61/567,962, filed Dec. 7, 2011, Baarman et al.

(Continued)

*Primary Examiner* — Francis Geroleo
(74) *Attorney, Agent, or Firm* — Sheridan Ross P.C.

(57) ABSTRACT

A system and method for monitoring pedestrians based upon information is collected by a wide array of sensors already included in modern motor vehicles. Also included, is a system of monitoring pedestrians by aggregating data collected by an array of vehicles.

12 Claims, 13 Drawing Sheets

(56) References Cited

U.S. PATENT DOCUMENTS

| | | | |
|---|---|---|---|
| 5,710,702 | A | 1/1998 | Hayashi et al. |
| 5,794,164 | A | 8/1998 | Beckert et al. |
| 5,797,134 | A | 8/1998 | McMillan et al. |
| 5,812,067 | A | 9/1998 | Bergholz et al. |
| 5,825,283 | A | 10/1998 | Camhi |
| 5,838,251 | A | 11/1998 | Brinkmeyer et al. |
| 5,847,661 | A | 12/1998 | Ricci |
| 5,890,080 | A | 3/1999 | Coverdill et al. |
| 5,928,294 | A | 7/1999 | Zelinkovsky |
| 5,949,345 | A | 9/1999 | Beckert et al. |
| 5,983,161 | A | 11/1999 | Lemelson et al. |
| 5,986,575 | A | 11/1999 | Jones et al. |
| 6,038,426 | A | 3/2000 | Williams, Jr. |
| 6,081,756 | A | 6/2000 | Mio et al. |
| D429,684 | S | 8/2000 | Johnson |
| 6,128,003 | A | 10/2000 | Smith et al. |
| 6,141,620 | A | 10/2000 | Zyburt et al. |
| 6,148,261 | A | 11/2000 | Obradovich et al. |
| 6,152,514 | A | 11/2000 | McLellen |
| 6,157,321 | A | 12/2000 | Ricci |
| 6,198,996 | B1 | 3/2001 | Berstis |
| 6,199,001 | B1 | 3/2001 | Ohta et al. |
| 6,202,008 | B1 | 3/2001 | Beckert et al. |
| 6,252,544 | B1 | 6/2001 | Hoffberg |
| 6,267,428 | B1 | 7/2001 | Baldas et al. |
| 6,302,438 | B1 | 10/2001 | Stopper, Jr. et al. |
| 6,310,542 | B1 | 10/2001 | Gehlot |
| 6,317,058 | B1 | 11/2001 | Lemelson et al. |
| 6,339,826 | B2 | 1/2002 | Hayes, Jr. et al. |
| 6,356,838 | B1 | 3/2002 | Paul |
| 6,388,579 | B1 | 5/2002 | Adcox et al. |
| 6,480,224 | B1 | 11/2002 | Brown |
| 6,502,022 | B1 | 12/2002 | Chastain et al. |
| 6,519,519 | B1 | 2/2003 | Stopczynski |
| 6,557,752 | B1 | 5/2003 | Yacoob |
| 6,563,910 | B2 | 5/2003 | Menard et al. |
| 6,587,739 | B1 | 7/2003 | Abrams et al. |
| 6,598,227 | B1 | 7/2003 | Berry et al. |
| 6,607,212 | B1 | 8/2003 | Reimer et al. |
| 6,617,981 | B2 | 9/2003 | Basinger |
| 6,662,077 | B2 | 12/2003 | Haag |
| 6,675,081 | B2 | 1/2004 | Shuman et al. |
| 6,678,747 | B2 | 1/2004 | Goossen et al. |
| 6,681,176 | B2 | 1/2004 | Funk et al. |
| 6,690,260 | B1 | 2/2004 | Ashihara |
| 6,690,940 | B1 | 2/2004 | Brown et al. |
| 6,724,920 | B1 | 4/2004 | Berenz et al. |
| 6,747,687 | B1 | 6/2004 | Alves |
| 6,754,580 | B1 | 6/2004 | Ask et al. |
| 6,757,593 | B2 | 6/2004 | Mori et al. |
| 6,762,684 | B1 | 7/2004 | Camhi |
| 6,765,495 | B1 | 7/2004 | Dunning et al. |
| 6,778,888 | B2 | 8/2004 | Cataldo et al. |
| 6,782,240 | B1 | 8/2004 | Tabe |
| 6,785,531 | B2 | 8/2004 | Lepley et al. |
| 6,816,783 | B2 | 11/2004 | Hashima et al. |
| 6,820,259 | B1 | 11/2004 | Kawamata et al. |
| 6,944,533 | B2 | 9/2005 | Obradovich et al. |
| 6,950,022 | B2 | 9/2005 | Breed |
| 6,958,707 | B1 | 10/2005 | Siegel |
| 6,992,580 | B2 | 1/2006 | Kotzin et al. |
| 7,019,641 | B1 | 3/2006 | Lakshmanan et al. |
| 7,020,544 | B2 | 3/2006 | Shinada et al. |
| 7,021,691 | B1 | 4/2006 | Schmidt et al. |
| 7,042,345 | B2 | 5/2006 | Ellis |
| 7,047,129 | B2 | 5/2006 | Uotani |
| 7,058,898 | B2 | 6/2006 | McWalter et al. |
| 7,096,431 | B2 | 8/2006 | Tambata et al. |
| 7,142,696 | B1 | 11/2006 | Engelsberg et al. |
| 7,164,117 | B2 | 1/2007 | Breed et al. |
| 7,187,947 | B1 | 3/2007 | White et al. |
| 7,203,598 | B1 | 4/2007 | Whitsell |
| 7,233,861 | B2 | 6/2007 | Van Buer et al. |
| 7,239,960 | B2 | 7/2007 | Yokota et al. |
| 7,277,454 | B2 | 10/2007 | Mocek et al. |
| 7,284,769 | B2 | 10/2007 | Breed |
| 7,289,645 | B2 | 10/2007 | Yamamoto et al. |
| 7,295,921 | B2 | 11/2007 | Spencer et al. |
| 7,313,547 | B2 | 12/2007 | Mocek et al. |
| 7,333,012 | B1 | 2/2008 | Nguyen |
| 7,343,148 | B1 | 3/2008 | O'Neil |
| 7,386,376 | B2 | 6/2008 | Basir et al. |
| 7,386,799 | B1 | 6/2008 | Clanton et al. |
| 7,432,829 | B2 | 10/2008 | Poltorak |
| 7,474,264 | B2 | 1/2009 | Bolduc et al. |
| 7,493,140 | B2 | 2/2009 | Michmerhuizen et al. |
| 7,526,539 | B1 | 4/2009 | Hsu |
| 7,548,815 | B2 | 6/2009 | Watkins et al. |
| 7,566,083 | B2 | 7/2009 | Vitito |
| 7,606,660 | B2 | 10/2009 | Diaz et al. |
| 7,606,867 | B1 | 10/2009 | Singhal et al. |
| 7,643,913 | B2 | 1/2010 | Taki et al. |
| 7,650,234 | B2 | 1/2010 | Obradovich et al. |
| 7,671,764 | B2 | 3/2010 | Uyeki et al. |
| 7,680,596 | B2 | 3/2010 | Uyeki et al. |
| 7,683,771 | B1 | 3/2010 | Loeb |
| 7,711,468 | B1 | 5/2010 | Levy |
| 7,734,315 | B2 | 6/2010 | Rathus et al. |
| 7,748,021 | B2 | 6/2010 | Obradovich et al. |
| RE41,449 | E | 7/2010 | Krahnstoever et al. |
| 7,791,499 | B2 | 9/2010 | Mohan et al. |
| 7,796,190 | B2 | 9/2010 | Basso et al. |
| 7,802,832 | B2 | 9/2010 | Carnevali |
| 7,821,421 | B2 | 10/2010 | Tamir et al. |
| 7,832,762 | B2 | 11/2010 | Breed |
| 7,864,073 | B2 | 1/2011 | Lee et al. |
| 7,872,591 | B2 | 1/2011 | Kane et al. |
| 7,873,471 | B2 | 1/2011 | Gieseke |
| 7,881,703 | B2 | 2/2011 | Roundtree et al. |
| 7,891,004 | B1 | 2/2011 | Gelvin et al. |
| 7,891,719 | B2 | 2/2011 | Carnevali |
| 7,899,610 | B2 | 3/2011 | McClellan |
| 7,966,678 | B2 | 6/2011 | Ten Eyck et al. |
| 7,969,290 | B2 | 6/2011 | Waeller et al. |
| 7,969,324 | B2 | 6/2011 | Chevion et al. |
| 8,060,631 | B2 | 11/2011 | Collart et al. |
| 8,064,925 | B1 | 11/2011 | Sun et al. |
| 8,066,313 | B2 | 11/2011 | Carnevali |
| 8,098,170 | B1 | 1/2012 | Szczerba et al. |
| 8,113,564 | B2 | 2/2012 | Carnevali |
| 8,131,419 | B2 | 3/2012 | Ampunan et al. |
| 8,157,310 | B2 | 4/2012 | Carnevali |
| 8,162,368 | B2 | 4/2012 | Carnevali |
| 8,175,802 | B2 | 5/2012 | Forstall et al. |
| 8,233,919 | B2 | 7/2012 | Haag et al. |
| 8,245,609 | B1 | 8/2012 | Greenwald et al. |
| 8,306,514 | B1 | 11/2012 | Nunally |
| 8,334,847 | B2 | 12/2012 | Tomkins |
| 8,346,233 | B2 | 1/2013 | Aaron et al. |
| 8,346,432 | B2 | 1/2013 | Van Wiemeersch et al. |
| 8,350,721 | B2 | 1/2013 | Carr |
| 8,352,282 | B2 | 1/2013 | Jensen et al. |
| 8,355,839 | B2 | 1/2013 | Schofield et al. |
| 8,369,263 | B2 | 2/2013 | Dowling et al. |
| 8,417,449 | B1 | 4/2013 | Denise |
| 8,432,260 | B2 | 4/2013 | Talty et al. |
| 8,442,389 | B2 | 5/2013 | Kashima et al. |
| 8,442,758 | B1 | 5/2013 | Rovik et al. |
| 8,467,965 | B2 | 6/2013 | Chang |
| 8,497,842 | B2 | 7/2013 | Tomkins et al. |
| 8,498,809 | B2 | 7/2013 | Bill |
| 8,509,982 | B2 | 8/2013 | Montemerlo et al. |
| 8,521,410 | B2 | 8/2013 | Mizuno et al. |
| 8,527,143 | B2 | 9/2013 | Tan |
| 8,527,146 | B1 | 9/2013 | Jackson et al. |
| 8,532,574 | B2 | 9/2013 | Kirsch |
| 8,543,330 | B2 | 9/2013 | Taylor et al. |
| 8,547,340 | B2 | 10/2013 | Sizelove et al. |
| 8,548,669 | B2 | 10/2013 | Naylor |
| 8,559,183 | B1 | 10/2013 | Davis |
| 8,577,600 | B1 | 11/2013 | Pierfelice |
| 8,578,279 | B2 | 11/2013 | Chen et al. |
| 8,583,292 | B2 | 11/2013 | Preston et al. |
| 8,589,073 | B2 | 11/2013 | Guha et al. |

(56) References Cited

U.S. PATENT DOCUMENTS

| | | |
|---|---|---|
| 8,600,611 B2 | 12/2013 | Seize |
| 8,613,385 B1 | 12/2013 | Hulet et al. |
| 8,621,645 B1 | 12/2013 | Spackman |
| 8,624,727 B2 | 1/2014 | Saigh et al. |
| 8,634,984 B2 | 1/2014 | Sumizawa |
| 8,644,165 B2 | 2/2014 | Saarimaki et al. |
| 8,660,735 B2 | 2/2014 | Tengler et al. |
| 8,671,068 B2 | 3/2014 | Harber et al. |
| 8,688,372 B2 | 4/2014 | Bhogal et al. |
| 8,705,527 B1 | 4/2014 | Addepalli et al. |
| 8,706,143 B1 | 4/2014 | Elias |
| 8,718,797 B1 | 5/2014 | Addepalli et al. |
| 8,725,311 B1 | 5/2014 | Breed |
| 8,730,033 B2 | 5/2014 | Yarnold et al. |
| 8,737,986 B2 | 5/2014 | Rhoads et al. |
| 8,761,673 B2 | 6/2014 | Sakata |
| 8,774,842 B2 | 7/2014 | Jones et al. |
| 8,779,947 B2 | 7/2014 | Tengler et al. |
| 8,782,262 B2 | 7/2014 | Collart et al. |
| 8,793,065 B2 | 7/2014 | Seltzer et al. |
| 8,798,918 B2 | 8/2014 | Onishi et al. |
| 8,805,110 B2 | 8/2014 | Rhoads et al. |
| 8,812,171 B2 | 8/2014 | Filev et al. |
| 8,817,761 B2 | 8/2014 | Gruberman et al. |
| 8,825,031 B2 | 9/2014 | Aaron et al. |
| 8,825,277 B2 | 9/2014 | McClellan et al. |
| 8,825,382 B2 | 9/2014 | Liu |
| 8,826,261 B1 | 9/2014 | Anand AG et al. |
| 8,838,088 B1 | 9/2014 | Henn et al. |
| 8,862,317 B2 | 10/2014 | Shin et al. |
| 8,977,408 B1 | 3/2015 | Cazanas et al. |
| 9,043,016 B2 | 5/2015 | Filippov et al. |
| 9,229,905 B1 | 1/2016 | Penilla et al. |
| 2001/0010516 A1 | 8/2001 | Roh et al. |
| 2001/0015888 A1 | 8/2001 | Shaler et al. |
| 2002/0009978 A1 | 1/2002 | Dukach et al. |
| 2002/0023010 A1 | 2/2002 | Rittmaster et al. |
| 2002/0026278 A1 | 2/2002 | Feldman et al. |
| 2002/0045484 A1 | 4/2002 | Eck et al. |
| 2002/0065046 A1 | 5/2002 | Mankins et al. |
| 2002/0077985 A1 | 6/2002 | Kobata et al. |
| 2002/0095249 A1 | 7/2002 | Lang |
| 2002/0097145 A1 | 7/2002 | Tumey et al. |
| 2002/0103622 A1 | 8/2002 | Burge |
| 2002/0105968 A1 | 8/2002 | Pruzan et al. |
| 2002/0126876 A1 | 9/2002 | Paul et al. |
| 2002/0128774 A1 | 9/2002 | Takezaki et al. |
| 2002/0143461 A1 | 10/2002 | Burns et al. |
| 2002/0143643 A1 | 10/2002 | Catan |
| 2002/0152010 A1 | 10/2002 | Colmenarez et al. |
| 2002/0154217 A1 | 10/2002 | Ikeda |
| 2002/0169551 A1 | 11/2002 | Inoue et al. |
| 2002/0174021 A1 | 11/2002 | Chu et al. |
| 2003/0004624 A1 | 1/2003 | Wilson et al. |
| 2003/0007227 A1 | 1/2003 | Ogino |
| 2003/0055557 A1 | 3/2003 | Dutta et al. |
| 2003/0060937 A1 | 3/2003 | Shinada et al. |
| 2003/0065432 A1 | 4/2003 | Shuman et al. |
| 2003/0101451 A1 | 5/2003 | Bentolila et al. |
| 2003/0109972 A1 | 6/2003 | Tak |
| 2003/0125846 A1 | 7/2003 | Yu et al. |
| 2003/0132666 A1 | 7/2003 | Bond et al. |
| 2003/0149530 A1 | 8/2003 | Stopczynski |
| 2003/0158638 A1 | 8/2003 | Yakes et al. |
| 2003/0182435 A1 | 9/2003 | Redlich et al. |
| 2003/0202683 A1 | 10/2003 | Ma et al. |
| 2003/0204290 A1 | 10/2003 | Sadler et al. |
| 2003/0230443 A1 | 12/2003 | Cramer et al. |
| 2004/0008253 A1 | 1/2004 | Monroe |
| 2004/0017292 A1 | 1/2004 | Reese et al. |
| 2004/0024502 A1 | 2/2004 | Squires et al. |
| 2004/0036622 A1 | 2/2004 | Dukach et al. |
| 2004/0039500 A1 | 2/2004 | Amendola et al. |
| 2004/0039504 A1 | 2/2004 | Coffee et al. |
| 2004/0068364 A1 | 4/2004 | Zhao et al. |
| 2004/0070920 A1 | 4/2004 | Flueli |
| 2004/0093155 A1 | 5/2004 | Simonds et al. |
| 2004/0117494 A1 | 6/2004 | Mitchell et al. |
| 2004/0128062 A1 | 7/2004 | Ogino et al. |
| 2004/0153356 A1 | 8/2004 | Lockwood et al. |
| 2004/0162019 A1 | 8/2004 | Horita et al. |
| 2004/0180653 A1 | 9/2004 | Royalty |
| 2004/0182574 A1 | 9/2004 | Adnan et al. |
| 2004/0193347 A1 | 9/2004 | Harumoto et al. |
| 2004/0203974 A1 | 10/2004 | Seibel |
| 2004/0204837 A1 | 10/2004 | Singleton |
| 2004/0209594 A1 | 10/2004 | Naboulsi |
| 2004/0217850 A1 | 11/2004 | Perttunen et al. |
| 2004/0225557 A1 | 11/2004 | Phelan et al. |
| 2004/0255123 A1 | 12/2004 | Noyama et al. |
| 2004/0257208 A1 | 12/2004 | Huang et al. |
| 2004/0260470 A1 | 12/2004 | Rast |
| 2005/0012599 A1 | 1/2005 | DeMatteo |
| 2005/0031100 A1 | 2/2005 | Iggulden et al. |
| 2005/0038598 A1 | 2/2005 | Oesterling et al. |
| 2005/0042999 A1 | 2/2005 | Rappaport |
| 2005/0065678 A1 | 3/2005 | Smith et al. |
| 2005/0065711 A1 | 3/2005 | Dahlgren et al. |
| 2005/0086051 A1 | 4/2005 | Brulle-Drews |
| 2005/0093717 A1 | 5/2005 | Lilja |
| 2005/0097541 A1 | 5/2005 | Holland |
| 2005/0114864 A1 | 5/2005 | Surace |
| 2005/0122235 A1 | 6/2005 | Teffer et al. |
| 2005/0124211 A1 | 6/2005 | Diessner et al. |
| 2005/0130744 A1 | 6/2005 | Eck et al. |
| 2005/0144156 A1 | 6/2005 | Barber |
| 2005/0149752 A1 | 7/2005 | Johnson et al. |
| 2005/0153760 A1 | 7/2005 | Varley |
| 2005/0159853 A1 | 7/2005 | Takahashi et al. |
| 2005/0159892 A1 | 7/2005 | Chung |
| 2005/0192727 A1 | 9/2005 | Shostak et al. |
| 2005/0197748 A1 | 9/2005 | Holst et al. |
| 2005/0197767 A1 | 9/2005 | Nortrup |
| 2005/0251324 A1 | 11/2005 | Wiener et al. |
| 2005/0261815 A1 | 11/2005 | Cowelchuk et al. |
| 2005/0278093 A1 | 12/2005 | Kameyama |
| 2005/0283284 A1 | 12/2005 | Grenier et al. |
| 2006/0015819 A1 | 1/2006 | Hawkins et al. |
| 2006/0036358 A1 | 2/2006 | Hale et al. |
| 2006/0044119 A1 | 3/2006 | Egelhaaf |
| 2006/0047386 A1 | 3/2006 | Kanevsky et al. |
| 2006/0058948 A1 | 3/2006 | Blass et al. |
| 2006/0059229 A1 | 3/2006 | Bain et al. |
| 2006/0125631 A1 | 6/2006 | Sharony |
| 2006/0130033 A1 | 6/2006 | Stoffels et al. |
| 2006/0142933 A1 | 6/2006 | Feng |
| 2006/0173841 A1 | 8/2006 | Bill |
| 2006/0175403 A1 | 8/2006 | McConnell et al. |
| 2006/0184319 A1 | 8/2006 | Seick et al. |
| 2006/0212909 A1 | 9/2006 | Girard et al. |
| 2006/0241836 A1 | 10/2006 | Kachouh et al. |
| 2006/0243056 A1 | 11/2006 | Sundermeyer et al. |
| 2006/0250272 A1 | 11/2006 | Puamau |
| 2006/0253307 A1 | 11/2006 | Warren et al. |
| 2006/0259210 A1 | 11/2006 | Tanaka et al. |
| 2006/0274829 A1 | 12/2006 | Siemens et al. |
| 2006/0282204 A1 | 12/2006 | Breed |
| 2006/0287807 A1 | 12/2006 | Teffer |
| 2006/0287865 A1 | 12/2006 | Cross et al. |
| 2006/0288382 A1 | 12/2006 | Vitito |
| 2006/0290516 A1 | 12/2006 | Muehlsteff et al. |
| 2007/0001831 A1 | 1/2007 | Raz et al. |
| 2007/0002032 A1 | 1/2007 | Powers et al. |
| 2007/0010942 A1 | 1/2007 | Bill |
| 2007/0015485 A1 | 1/2007 | DeBiasio et al. |
| 2007/0028370 A1 | 2/2007 | Seng |
| 2007/0032225 A1 | 2/2007 | Konicek et al. |
| 2007/0057781 A1 | 3/2007 | Breed |
| 2007/0061057 A1 | 3/2007 | Huang et al. |
| 2007/0067614 A1 | 3/2007 | Berry et al. |
| 2007/0069880 A1 | 3/2007 | Best et al. |
| 2007/0083298 A1 | 4/2007 | Pierce et al. |
| 2007/0088488 A1 | 4/2007 | Reeves et al. |
| 2007/0103328 A1 | 5/2007 | Lakshmanan et al. |

(56) References Cited

U.S. PATENT DOCUMENTS

| | | |
|---|---|---|
| 2007/0115101 A1 | 5/2007 | Creekbaum et al. |
| 2007/0118301 A1 | 5/2007 | Andarawis et al. |
| 2007/0120697 A1 | 5/2007 | Ayoub et al. |
| 2007/0135995 A1 | 6/2007 | Kikuchi et al. |
| 2007/0139182 A1 | 6/2007 | O'Connor et al. |
| 2007/0156317 A1 | 7/2007 | Breed |
| 2007/0182625 A1 | 8/2007 | Kerai et al. |
| 2007/0182816 A1 | 8/2007 | Fox |
| 2007/0185969 A1 | 8/2007 | Davis |
| 2007/0192486 A1 | 8/2007 | Wilson et al. |
| 2007/0194902 A1 | 8/2007 | Blanco et al. |
| 2007/0194944 A1 | 8/2007 | Galera et al. |
| 2007/0195997 A1 | 8/2007 | Paul et al. |
| 2007/0200663 A1 | 8/2007 | White et al. |
| 2007/0208860 A1 | 9/2007 | Zellner et al. |
| 2007/0213090 A1 | 9/2007 | Holmberg |
| 2007/0228826 A1 | 10/2007 | Jordan et al. |
| 2007/0233341 A1 | 10/2007 | Logsdon |
| 2007/0250228 A1 | 10/2007 | Reddy et al. |
| 2007/0257815 A1 | 11/2007 | Gunderson et al. |
| 2007/0276596 A1 | 11/2007 | Solomon et al. |
| 2007/0280505 A1 | 12/2007 | Breed |
| 2008/0005974 A1 | 1/2008 | Delgado Vazquez et al. |
| 2008/0023253 A1 | 1/2008 | Prost-Fin et al. |
| 2008/0027337 A1 | 1/2008 | Dugan et al. |
| 2008/0033635 A1 | 2/2008 | Obradovich et al. |
| 2008/0042824 A1 | 2/2008 | Kates |
| 2008/0051957 A1 | 2/2008 | Breed et al. |
| 2008/0052627 A1 | 2/2008 | Oguchi |
| 2008/0071465 A1 | 3/2008 | Chapman et al. |
| 2008/0082237 A1 | 4/2008 | Breed |
| 2008/0086455 A1 | 4/2008 | Meisels et al. |
| 2008/0090522 A1 | 4/2008 | Oyama |
| 2008/0097699 A1* | 4/2008 | Ono .............. B60R 21/0134 701/300 |
| 2008/0104227 A1 | 5/2008 | Birnie et al. |
| 2008/0119994 A1 | 5/2008 | Kameyama |
| 2008/0129475 A1 | 6/2008 | Breed et al. |
| 2008/0143085 A1 | 6/2008 | Breed et al. |
| 2008/0147280 A1 | 6/2008 | Breed |
| 2008/0148374 A1 | 6/2008 | Spaur et al. |
| 2008/0154712 A1 | 6/2008 | Wellman |
| 2008/0154957 A1 | 6/2008 | Taylor et al. |
| 2008/0161986 A1 | 7/2008 | Breed |
| 2008/0164985 A1 | 7/2008 | Iketani et al. |
| 2008/0169940 A1 | 7/2008 | Lee et al. |
| 2008/0174451 A1 | 7/2008 | Harrington et al. |
| 2008/0212215 A1 | 9/2008 | Schofield et al. |
| 2008/0216067 A1 | 9/2008 | Villing |
| 2008/0228358 A1 | 9/2008 | Wang et al. |
| 2008/0234919 A1 | 9/2008 | Ritter et al. |
| 2008/0252487 A1 | 10/2008 | McClellan et al. |
| 2008/0253613 A1 | 10/2008 | Jones et al. |
| 2008/0255721 A1 | 10/2008 | Yamada |
| 2008/0255722 A1 | 10/2008 | McClellan et al. |
| 2008/0269958 A1 | 10/2008 | Filev et al. |
| 2008/0281508 A1 | 11/2008 | Fu |
| 2008/0300778 A1 | 12/2008 | Kuznetsov |
| 2008/0305780 A1 | 12/2008 | Williams et al. |
| 2008/0319602 A1 | 12/2008 | McClellan et al. |
| 2009/0006525 A1 | 1/2009 | Moore |
| 2009/0024419 A1 | 1/2009 | McClellan et al. |
| 2009/0037719 A1 | 2/2009 | Sakthikumar et al. |
| 2009/0040026 A1 | 2/2009 | Tanaka |
| 2009/0055178 A1 | 2/2009 | Coon |
| 2009/0082951 A1 | 3/2009 | Graessley |
| 2009/0099720 A1 | 4/2009 | Elgali |
| 2009/0112393 A1 | 4/2009 | Maten et al. |
| 2009/0112452 A1 | 4/2009 | Buck et al. |
| 2009/0119657 A1 | 5/2009 | Link, II |
| 2009/0125174 A1 | 5/2009 | Delean |
| 2009/0132294 A1 | 5/2009 | Haines |
| 2009/0138336 A1 | 5/2009 | Ashley et al. |
| 2009/0144622 A1 | 6/2009 | Evans et al. |
| 2009/0157312 A1 | 6/2009 | Black et al. |
| 2009/0158200 A1 | 6/2009 | Palahnuk et al. |
| 2009/0180668 A1 | 7/2009 | Jones et al. |
| 2009/0189373 A1 | 7/2009 | Schramm et al. |
| 2009/0189979 A1 | 7/2009 | Smyth |
| 2009/0195370 A1 | 8/2009 | Huffman et al. |
| 2009/0210257 A1 | 8/2009 | Chalfant et al. |
| 2009/0216935 A1 | 8/2009 | Flick |
| 2009/0222200 A1 | 9/2009 | Link et al. |
| 2009/0224931 A1 | 9/2009 | Dietz et al. |
| 2009/0224942 A1 | 9/2009 | Goudy et al. |
| 2009/0234578 A1 | 9/2009 | Newby et al. |
| 2009/0241883 A1 | 10/2009 | Nagoshi et al. |
| 2009/0254446 A1 | 10/2009 | Chernyak |
| 2009/0264849 A1 | 10/2009 | La Croix |
| 2009/0275321 A1 | 11/2009 | Crowe |
| 2009/0278750 A1 | 11/2009 | Man et al. |
| 2009/0278915 A1 | 11/2009 | Kramer et al. |
| 2009/0278938 A1 | 11/2009 | Shulman |
| 2009/0279839 A1 | 11/2009 | Nakamura et al. |
| 2009/0284359 A1 | 11/2009 | Huang et al. |
| 2009/0287405 A1 | 11/2009 | Liu et al. |
| 2009/0299572 A1 | 12/2009 | Fujikawa et al. |
| 2009/0312998 A1 | 12/2009 | Berckmans et al. |
| 2009/0319181 A1 | 12/2009 | Khosravy et al. |
| 2010/0008053 A1 | 1/2010 | Osternack et al. |
| 2010/0023204 A1 | 1/2010 | Basir et al. |
| 2010/0035620 A1 | 2/2010 | Naden et al. |
| 2010/0036560 A1 | 2/2010 | Wright et al. |
| 2010/0042498 A1 | 2/2010 | Schalk |
| 2010/0052945 A1 | 3/2010 | Breed |
| 2010/0057337 A1 | 3/2010 | Fuchs |
| 2010/0066498 A1 | 3/2010 | Fenton |
| 2010/0069115 A1 | 3/2010 | Liu |
| 2010/0070338 A1 | 3/2010 | Siotia et al. |
| 2010/0077094 A1 | 3/2010 | Howarter et al. |
| 2010/0087987 A1 | 4/2010 | Huang et al. |
| 2010/0090817 A1 | 4/2010 | Yamaguchi et al. |
| 2010/0097178 A1 | 4/2010 | Pisz et al. |
| 2010/0097239 A1 | 4/2010 | Campbell et al. |
| 2010/0097458 A1 | 4/2010 | Zhang et al. |
| 2010/0106344 A1 | 4/2010 | Edwards et al. |
| 2010/0106418 A1 | 4/2010 | Kindo et al. |
| 2010/0118025 A1 | 5/2010 | Smith et al. |
| 2010/0121570 A1 | 5/2010 | Tokue et al. |
| 2010/0121645 A1 | 5/2010 | Seitz et al. |
| 2010/0125387 A1 | 5/2010 | Sehyun et al. |
| 2010/0125405 A1 | 5/2010 | Chae et al. |
| 2010/0125811 A1 | 5/2010 | Moore et al. |
| 2010/0127847 A1 | 5/2010 | Evans et al. |
| 2010/0131300 A1 | 5/2010 | Collopy et al. |
| 2010/0134958 A1 | 6/2010 | Disaverio et al. |
| 2010/0136944 A1 | 6/2010 | Taylor et al. |
| 2010/0137037 A1 | 6/2010 | Basir |
| 2010/0144284 A1 | 6/2010 | Chutorash et al. |
| 2010/0145700 A1 | 6/2010 | Kennewick et al. |
| 2010/0145987 A1 | 6/2010 | Harper et al. |
| 2010/0152976 A1 | 6/2010 | White et al. |
| 2010/0169432 A1 | 7/2010 | Santori et al. |
| 2010/0174474 A1 | 7/2010 | Nagase |
| 2010/0179712 A1 | 7/2010 | Pepitone et al. |
| 2010/0185341 A1 | 7/2010 | Wilson et al. |
| 2010/0188831 A1 | 7/2010 | Ortel |
| 2010/0197359 A1 | 8/2010 | Harris |
| 2010/0202346 A1 | 8/2010 | Sitzes et al. |
| 2010/0211259 A1 | 8/2010 | McClellan |
| 2010/0211282 A1 | 8/2010 | Nakata et al. |
| 2010/0211300 A1 | 8/2010 | Jaffe et al. |
| 2010/0211304 A1 | 8/2010 | Hwang et al. |
| 2010/0211441 A1 | 8/2010 | Sprigg et al. |
| 2010/0217458 A1 | 8/2010 | Schweiger et al. |
| 2010/0222939 A1 | 9/2010 | Namburu et al. |
| 2010/0228404 A1 | 9/2010 | Link et al. |
| 2010/0234071 A1 | 9/2010 | Shabtay et al. |
| 2010/0235042 A1 | 9/2010 | Ying |
| 2010/0235744 A1 | 9/2010 | Schultz |
| 2010/0235891 A1 | 9/2010 | Oglesbee et al. |
| 2010/0250071 A1 | 9/2010 | Pala et al. |
| 2010/0253493 A1 | 10/2010 | Szczerba et al. |
| 2010/0256836 A1 | 10/2010 | Mudalige |

(56) References Cited

U.S. PATENT DOCUMENTS

| | | |
|---|---|---|
| 2010/0265104 A1 | 10/2010 | Zlojutro |
| 2010/0268426 A1 | 10/2010 | Pathak et al. |
| 2010/0274410 A1 | 10/2010 | Tsien et al. |
| 2010/0280751 A1 | 11/2010 | Breed |
| 2010/0287303 A1 | 11/2010 | Smith et al. |
| 2010/0289632 A1 | 11/2010 | Seder et al. |
| 2010/0289643 A1 | 11/2010 | Trundle et al. |
| 2010/0291427 A1 | 11/2010 | Zhou |
| 2010/0295676 A1 | 11/2010 | Khachaturov et al. |
| 2010/0304640 A1 | 12/2010 | Sofman et al. |
| 2010/0305807 A1 | 12/2010 | Basir et al. |
| 2010/0306080 A1 | 12/2010 | Trandal et al. |
| 2010/0306309 A1 | 12/2010 | Santori et al. |
| 2010/0306435 A1 | 12/2010 | Nigoghosian et al. |
| 2010/0315218 A1 | 12/2010 | Cades et al. |
| 2010/0321151 A1 | 12/2010 | Matsuura et al. |
| 2010/0325626 A1 | 12/2010 | Greschler et al. |
| 2010/0332130 A1 | 12/2010 | Shimizu et al. |
| 2011/0015853 A1 | 1/2011 | DeKock et al. |
| 2011/0018736 A1 | 1/2011 | Carr |
| 2011/0021213 A1 | 1/2011 | Carr |
| 2011/0021234 A1 | 1/2011 | Tibbits et al. |
| 2011/0028138 A1 | 2/2011 | Davies-Moore et al. |
| 2011/0035098 A1 | 2/2011 | Goto et al. |
| 2011/0035141 A1 | 2/2011 | Barker et al. |
| 2011/0040438 A1 | 2/2011 | Kluge et al. |
| 2011/0050589 A1 | 3/2011 | Yan et al. |
| 2011/0053506 A1 | 3/2011 | Lemke et al. |
| 2011/0077808 A1 | 3/2011 | Hyde et al. |
| 2011/0078024 A1 | 3/2011 | Messier et al. |
| 2011/0080282 A1 | 4/2011 | Kleve et al. |
| 2011/0082615 A1 | 4/2011 | Small et al. |
| 2011/0084824 A1 | 4/2011 | Tewari et al. |
| 2011/0090078 A1 | 4/2011 | Kim et al. |
| 2011/0092159 A1 | 4/2011 | Park et al. |
| 2011/0093154 A1 | 4/2011 | Moinzadeh et al. |
| 2011/0093158 A1 | 4/2011 | Theisen et al. |
| 2011/0093438 A1 | 4/2011 | Poulsen |
| 2011/0093846 A1 | 4/2011 | Moinzadeh et al. |
| 2011/0105097 A1 | 5/2011 | Tadayon et al. |
| 2011/0106375 A1 | 5/2011 | Sundaram et al. |
| 2011/0112717 A1 | 5/2011 | Resner |
| 2011/0112969 A1 | 5/2011 | Zaid et al. |
| 2011/0117933 A1 | 5/2011 | Andersson |
| 2011/0119344 A1 | 5/2011 | Eustis |
| 2011/0130915 A1 | 6/2011 | Wright et al. |
| 2011/0134749 A1 | 6/2011 | Speks et al. |
| 2011/0137520 A1 | 6/2011 | Rector et al. |
| 2011/0145331 A1 | 6/2011 | Christie et al. |
| 2011/0172873 A1 | 7/2011 | Szwabowski et al. |
| 2011/0175754 A1 | 7/2011 | Karpinsky |
| 2011/0183658 A1 | 7/2011 | Zellner |
| 2011/0187520 A1 | 8/2011 | Filev et al. |
| 2011/0193707 A1 | 8/2011 | Ngo |
| 2011/0193726 A1 | 8/2011 | Szwabowski et al. |
| 2011/0195699 A1 | 8/2011 | Tadayon et al. |
| 2011/0197187 A1 | 8/2011 | Roh |
| 2011/0205047 A1 | 8/2011 | Patel et al. |
| 2011/0209079 A1 | 8/2011 | Tarte et al. |
| 2011/0210867 A1 | 9/2011 | Benedikt |
| 2011/0212717 A1 | 9/2011 | Rhoads et al. |
| 2011/0221656 A1 | 9/2011 | Haddick et al. |
| 2011/0224865 A1 | 9/2011 | Gordon et al. |
| 2011/0224898 A1 | 9/2011 | Scofield et al. |
| 2011/0225527 A1 | 9/2011 | Law et al. |
| 2011/0227757 A1 | 9/2011 | Chen et al. |
| 2011/0231091 A1 | 9/2011 | Gourlay et al. |
| 2011/0234369 A1 | 9/2011 | Cai et al. |
| 2011/0245999 A1 | 10/2011 | Kordonowy |
| 2011/0246210 A1 | 10/2011 | Matsur |
| 2011/0247013 A1 | 10/2011 | Feller et al. |
| 2011/0251734 A1 | 10/2011 | Schepp et al. |
| 2011/0257973 A1 | 10/2011 | Chutorash et al. |
| 2011/0267204 A1 | 11/2011 | Chuang et al. |
| 2011/0267205 A1 | 11/2011 | McClellan et al. |
| 2011/0286676 A1 | 11/2011 | El Dokor |
| 2011/0291886 A1 | 12/2011 | Krieter |
| 2011/0291926 A1 | 12/2011 | Gokturk et al. |
| 2011/0298808 A1 | 12/2011 | Rovik |
| 2011/0301844 A1 | 12/2011 | Aono |
| 2011/0307354 A1 | 12/2011 | Erman et al. |
| 2011/0307570 A1 | 12/2011 | Speks |
| 2011/0309926 A1 | 12/2011 | Eikelenberg et al. |
| 2011/0309953 A1 | 12/2011 | Petite et al. |
| 2011/0313653 A1 | 12/2011 | Lindner |
| 2011/0320089 A1 | 12/2011 | Lewis |
| 2012/0006610 A1 | 1/2012 | Wallace et al. |
| 2012/0010807 A1 | 1/2012 | Zhou |
| 2012/0016581 A1 | 1/2012 | Mochizuki et al. |
| 2012/0028599 A1 | 2/2012 | Hatton |
| 2012/0029852 A1 | 2/2012 | Goff et al. |
| 2012/0030002 A1 | 2/2012 | Bous et al. |
| 2012/0030512 A1 | 2/2012 | Wadhwa et al. |
| 2012/0038489 A1 | 2/2012 | Goldshmidt |
| 2012/0046822 A1 | 2/2012 | Anderson |
| 2012/0047530 A1 | 2/2012 | Shkedi |
| 2012/0053793 A1 | 3/2012 | Sala et al. |
| 2012/0053888 A1 | 3/2012 | Stahlin et al. |
| 2012/0059789 A1 | 3/2012 | Sakai et al. |
| 2012/0065815 A1 | 3/2012 | Hess |
| 2012/0065834 A1 | 3/2012 | Senart |
| 2012/0068956 A1 | 3/2012 | Jira et al. |
| 2012/0071097 A1 | 3/2012 | Matsushita et al. |
| 2012/0072244 A1 | 3/2012 | Collins et al. |
| 2012/0074770 A1 | 3/2012 | Lee |
| 2012/0083960 A1* | 4/2012 | Zhu ................ G06T 7/223 701/23 |
| 2012/0083971 A1 | 4/2012 | Preston |
| 2012/0084773 A1 | 4/2012 | Lee et al. |
| 2012/0089299 A1 | 4/2012 | Breed |
| 2012/0092251 A1 | 4/2012 | Hashimoto et al. |
| 2012/0101876 A1 | 4/2012 | Truvey et al. |
| 2012/0101914 A1 | 4/2012 | Kumar et al. |
| 2012/0105613 A1 | 5/2012 | Weng et al. |
| 2012/0106114 A1 | 5/2012 | Caron et al. |
| 2012/0109446 A1 | 5/2012 | Yousefi et al. |
| 2012/0109451 A1 | 5/2012 | Tan |
| 2012/0110356 A1 | 5/2012 | Yousefi et al. |
| 2012/0113822 A1 | 5/2012 | Letner |
| 2012/0115446 A1 | 5/2012 | Guatama et al. |
| 2012/0116609 A1 | 5/2012 | Jung et al. |
| 2012/0116678 A1 | 5/2012 | Witmer |
| 2012/0116696 A1 | 5/2012 | Wank |
| 2012/0136559 A1 | 5/2012 | Rothschild |
| 2012/0146766 A1 | 6/2012 | Geisler et al. |
| 2012/0146809 A1 | 6/2012 | Oh et al. |
| 2012/0149341 A1 | 6/2012 | Tadayon et al. |
| 2012/0150651 A1 | 6/2012 | Hoffberg et al. |
| 2012/0155636 A1 | 6/2012 | Muthaiah |
| 2012/0158436 A1 | 6/2012 | Bauer et al. |
| 2012/0173900 A1 | 7/2012 | Diab et al. |
| 2012/0173905 A1 | 7/2012 | Diab et al. |
| 2012/0179325 A1 | 7/2012 | Faenger |
| 2012/0179547 A1 | 7/2012 | Besore et al. |
| 2012/0188876 A1 | 7/2012 | Chow et al. |
| 2012/0197523 A1 | 8/2012 | Kirsch |
| 2012/0197669 A1 | 8/2012 | Kote et al. |
| 2012/0204166 A1 | 8/2012 | Ichihara |
| 2012/0210160 A1 | 8/2012 | Fuhrman |
| 2012/0215375 A1 | 8/2012 | Chang |
| 2012/0217928 A1 | 8/2012 | Kulidjian |
| 2012/0218125 A1 | 8/2012 | Demirdjian et al. |
| 2012/0226413 A1 | 9/2012 | Chen et al. |
| 2012/0238286 A1 | 9/2012 | Mallavarapu et al. |
| 2012/0239242 A1 | 9/2012 | Uehara |
| 2012/0242510 A1 | 9/2012 | Choi et al. |
| 2012/0254763 A1 | 10/2012 | Protopapas et al. |
| 2012/0254804 A1 | 10/2012 | Shema et al. |
| 2012/0259951 A1 | 10/2012 | Schalk et al. |
| 2012/0265359 A1 | 10/2012 | Das |
| 2012/0274459 A1 | 11/2012 | Jaisimha et al. |
| 2012/0274481 A1 | 11/2012 | Ginsberg et al. |
| 2012/0284292 A1 | 11/2012 | Rechsteiner et al. |
| 2012/0289217 A1 | 11/2012 | Reimer et al. |

(56) References Cited

U.S. PATENT DOCUMENTS

| | | |
|---|---|---|
| 2012/0289253 A1 | 11/2012 | Haag et al. |
| 2012/0296567 A1 | 11/2012 | Breed |
| 2012/0313771 A1 | 12/2012 | Wottlifff, III |
| 2012/0316720 A1 | 12/2012 | Hyde et al. |
| 2012/0317561 A1 | 12/2012 | Aslam et al. |
| 2012/0323413 A1 | 12/2012 | Kedar-Dongarkar et al. |
| 2012/0327231 A1 | 12/2012 | Cochran et al. |
| 2013/0005263 A1 | 1/2013 | Sakata |
| 2013/0005414 A1 | 1/2013 | Bindra et al. |
| 2013/0013157 A1 | 1/2013 | Kim et al. |
| 2013/0019252 A1 | 1/2013 | Haase et al. |
| 2013/0024060 A1 | 1/2013 | Sukkarie et al. |
| 2013/0030645 A1 | 1/2013 | Divine et al. |
| 2013/0030811 A1 | 1/2013 | Olleon et al. |
| 2013/0031540 A1 | 1/2013 | Throop et al. |
| 2013/0031541 A1 | 1/2013 | Wilks et al. |
| 2013/0035063 A1 | 2/2013 | Fisk et al. |
| 2013/0046624 A1 | 2/2013 | Calman |
| 2013/0050069 A1 | 2/2013 | Ota |
| 2013/0055096 A1 | 2/2013 | Kim et al. |
| 2013/0059607 A1 | 3/2013 | Herz et al. |
| 2013/0063336 A1 | 3/2013 | Sugimoto et al. |
| 2013/0066512 A1 | 3/2013 | Willard et al. |
| 2013/0067599 A1 | 3/2013 | Raje et al. |
| 2013/0075530 A1 | 3/2013 | Shander et al. |
| 2013/0079964 A1 | 3/2013 | Sukkarie et al. |
| 2013/0083805 A1 | 4/2013 | Lu et al. |
| 2013/0085787 A1 | 4/2013 | Gore et al. |
| 2013/0086164 A1 | 4/2013 | Wheeler et al. |
| 2013/0099915 A1 | 4/2013 | Prasad et al. |
| 2013/0103196 A1 | 4/2013 | Monceaux et al. |
| 2013/0116882 A1 | 5/2013 | Link et al. |
| 2013/0116915 A1 | 5/2013 | Ferreira et al. |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0139140 A1 | 5/2013 | Rao et al. |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144469 A1 | 6/2013 | Ricci |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0151288 A1 | 6/2013 | Bowne et al. |
| 2013/0152003 A1 | 6/2013 | Ricci et al. |
| 2013/0154298 A1 | 6/2013 | Ricci |
| 2013/0157640 A1 | 6/2013 | Aycock |
| 2013/0157647 A1 | 6/2013 | Kolodziej |
| 2013/0158778 A1 | 6/2013 | Tengler et al. |
| 2013/0158821 A1 | 6/2013 | Ricci |
| 2013/0166096 A1 | 6/2013 | Jotanovic |
| 2013/0166097 A1 | 6/2013 | Ricci |
| 2013/0166098 A1 | 6/2013 | Lavie et al. |
| 2013/0166152 A1 | 6/2013 | Butterworth |
| 2013/0166208 A1 | 6/2013 | Forstall et al. |
| 2013/0167159 A1 | 6/2013 | Ricci et al. |
| 2013/0173531 A1 | 7/2013 | Rinearson et al. |
| 2013/0179689 A1 | 7/2013 | Matsumoto et al. |
| 2013/0190978 A1 | 7/2013 | Kato et al. |
| 2013/0194108 A1 | 8/2013 | Lapiotis et al. |
| 2013/0197796 A1 | 8/2013 | Obradovich et al. |
| 2013/0198031 A1 | 8/2013 | Mitchell et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204455 A1 | 8/2013 | Chia et al. |
| 2013/0204457 A1 | 8/2013 | King |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204943 A1 | 8/2013 | Ricci |
| 2013/0205026 A1 | 8/2013 | Ricci |
| 2013/0205412 A1 | 8/2013 | Ricci |
| 2013/0207794 A1 | 8/2013 | Patel et al. |
| 2013/0212065 A1 | 8/2013 | Rahnama |
| 2013/0212659 A1 | 8/2013 | Maher et al. |
| 2013/0215116 A1 | 8/2013 | Siddique et al. |
| 2013/0218412 A1 | 8/2013 | Ricci |
| 2013/0218445 A1 | 8/2013 | Basir |
| 2013/0219039 A1 | 8/2013 | Ricci |
| 2013/0226365 A1 | 8/2013 | Brozovich |
| 2013/0226371 A1 | 8/2013 | Rovik et al. |
| 2013/0226392 A1 | 8/2013 | Schneider et al. |
| 2013/0226449 A1 | 8/2013 | Rovik et al. |
| 2013/0226622 A1 | 8/2013 | Adamson et al. |
| 2013/0227648 A1 | 8/2013 | Ricci |
| 2013/0231784 A1 | 9/2013 | Rovik et al. |
| 2013/0231800 A1 | 9/2013 | Ricci |
| 2013/0232142 A1 | 9/2013 | Nielsen et al. |
| 2013/0238165 A1 | 9/2013 | Garrett et al. |
| 2013/0241720 A1 | 9/2013 | Ricci et al. |
| 2013/0245882 A1 | 9/2013 | Ricci |
| 2013/0250933 A1 | 9/2013 | Yousefi et al. |
| 2013/0261871 A1 | 10/2013 | Hobbs et al. |
| 2013/0261966 A1 | 10/2013 | Wang et al. |
| 2013/0265178 A1 | 10/2013 | Tengler et al. |
| 2013/0274997 A1 | 10/2013 | Chien |
| 2013/0279111 A1 | 10/2013 | Lee |
| 2013/0279491 A1 | 10/2013 | Rubin et al. |
| 2013/0282238 A1 | 10/2013 | Ricci et al. |
| 2013/0282357 A1 | 10/2013 | Rubin et al. |
| 2013/0282946 A1 | 10/2013 | Ricci |
| 2013/0288606 A1 | 10/2013 | Kirsch |
| 2013/0293364 A1 | 11/2013 | Ricci et al. |
| 2013/0293452 A1 | 11/2013 | Ricci et al. |
| 2013/0293480 A1 | 11/2013 | Kritt et al. |
| 2013/0295901 A1 | 11/2013 | Abramson et al. |
| 2013/0295908 A1 | 11/2013 | Zeinstra et al. |
| 2013/0295913 A1 | 11/2013 | Matthews et al. |
| 2013/0300554 A1 | 11/2013 | Braden |
| 2013/0301584 A1 | 11/2013 | Addepalli et al. |
| 2013/0304371 A1 | 11/2013 | Kitatani et al. |
| 2013/0308265 A1 | 11/2013 | Arnouse |
| 2013/0309977 A1 | 11/2013 | Heines et al. |
| 2013/0311038 A1 | 11/2013 | Kim et al. |
| 2013/0325453 A1 | 12/2013 | Levien et al. |
| 2013/0325568 A1 | 12/2013 | Mangalvedkar et al. |
| 2013/0329372 A1 | 12/2013 | Wilkins |
| 2013/0332023 A1 | 12/2013 | Bertosa et al. |
| 2013/0338914 A1 | 12/2013 | Weiss |
| 2013/0339027 A1 | 12/2013 | Dokor et al. |
| 2013/0345929 A1 | 12/2013 | Bowden et al. |
| 2014/0028542 A1 | 1/2014 | Lovitt et al. |
| 2014/0032014 A1 | 1/2014 | DeBiasio et al. |
| 2014/0046192 A1* | 2/2014 | Mullin ............... H05K 13/00 600/474 |
| 2014/0054957 A1 | 2/2014 | Bellis |
| 2014/0058672 A1 | 2/2014 | Wansley et al. |
| 2014/0066014 A1 | 3/2014 | Nicholson et al. |
| 2014/0067201 A1 | 3/2014 | Visintainer et al. |
| 2014/0067564 A1 | 3/2014 | Yuan |
| 2014/0070917 A1 | 3/2014 | Protopapas |

(56) References Cited

U.S. PATENT DOCUMENTS

| | | |
|---|---|---|
| 2014/0081544 A1 | 3/2014 | Fry |
| 2014/0088798 A1 | 3/2014 | Himmelstein |
| 2014/0096068 A1 | 4/2014 | Dewan et al. |
| 2014/0097955 A1 | 4/2014 | Lovitt et al. |
| 2014/0109075 A1 | 4/2014 | Hoffman et al. |
| 2014/0109080 A1 | 4/2014 | Ricci |
| 2014/0120829 A1 | 5/2014 | Bhamidipati et al. |
| 2014/0121862 A1 | 5/2014 | Zarrella et al. |
| 2014/0125802 A1 | 5/2014 | Beckert et al. |
| 2014/0143839 A1 | 5/2014 | Ricci |
| 2014/0164611 A1 | 6/2014 | Molettiere et al. |
| 2014/0168062 A1 | 6/2014 | Katz et al. |
| 2014/0168436 A1 | 6/2014 | Pedicino |
| 2014/0169621 A1 | 6/2014 | Burr |
| 2014/0171752 A1 | 6/2014 | Park et al. |
| 2014/0172727 A1 | 6/2014 | Abhyanker et al. |
| 2014/0188533 A1 | 7/2014 | Davidson |
| 2014/0195272 A1 | 7/2014 | Sadiq et al. |
| 2014/0198216 A1 | 7/2014 | Zhai et al. |
| 2014/0200737 A1 | 7/2014 | Lortz et al. |
| 2014/0207328 A1 | 7/2014 | Wolf et al. |
| 2014/0220966 A1 | 8/2014 | Muetzel et al. |
| 2014/0222298 A1 | 8/2014 | Gurin |
| 2014/0223384 A1 | 8/2014 | Graumann |
| 2014/0240089 A1 | 8/2014 | Chang |
| 2014/0244078 A1 | 8/2014 | Downey et al. |
| 2014/0244111 A1 | 8/2014 | Gross et al. |
| 2014/0244156 A1 | 8/2014 | Magnusson et al. |
| 2014/0245277 A1 | 8/2014 | Petro et al. |
| 2014/0245278 A1 | 8/2014 | Zellen |
| 2014/0245284 A1 | 8/2014 | Alrabady et al. |
| 2014/0252091 A1 | 9/2014 | Morse et al. |
| 2014/0257627 A1 | 9/2014 | Hagan, Jr. |
| 2014/0267035 A1 | 9/2014 | Schalk et al. |
| 2014/0277936 A1 | 9/2014 | El Dokor et al. |
| 2014/0278070 A1 | 9/2014 | McGavran et al. |
| 2014/0278071 A1 | 9/2014 | San Filippo et al. |
| 2014/0281971 A1 | 9/2014 | Isbell, III et al. |
| 2014/0282161 A1 | 9/2014 | Cash |
| 2014/0282278 A1 | 9/2014 | Anderson et al. |
| 2014/0282470 A1 | 9/2014 | Buga et al. |
| 2014/0282931 A1 | 9/2014 | Protopapas |
| 2014/0292545 A1 | 10/2014 | Nemoto |
| 2014/0292665 A1 | 10/2014 | Lathrop et al. |
| 2014/0303899 A1 | 10/2014 | Fung |
| 2014/0306799 A1 | 10/2014 | Ricci |
| 2014/0306814 A1 | 10/2014 | Ricci |
| 2014/0306817 A1 | 10/2014 | Ricci |
| 2014/0306826 A1 | 10/2014 | Ricci |
| 2014/0306833 A1 | 10/2014 | Ricci |
| 2014/0306834 A1 | 10/2014 | Ricci |
| 2014/0306835 A1 | 10/2014 | Ricci |
| 2014/0307655 A1 | 10/2014 | Ricci |
| 2014/0307724 A1 | 10/2014 | Ricci |
| 2014/0308902 A1 | 10/2014 | Ricci |
| 2014/0309789 A1 | 10/2014 | Ricci |
| 2014/0309790 A1 | 10/2014 | Ricci |
| 2014/0309804 A1 | 10/2014 | Ricci |
| 2014/0309805 A1 | 10/2014 | Ricci |
| 2014/0309806 A1 | 10/2014 | Ricci |
| 2014/0309813 A1 | 10/2014 | Ricci |
| 2014/0309814 A1 | 10/2014 | Ricci et al. |
| 2014/0309815 A1 | 10/2014 | Ricci et al. |
| 2014/0309838 A1 | 10/2014 | Ricci |
| 2014/0309839 A1 | 10/2014 | Ricci et al. |
| 2014/0309847 A1 | 10/2014 | Ricci |
| 2014/0309849 A1 | 10/2014 | Ricci |
| 2014/0309852 A1 | 10/2014 | Ricci |
| 2014/0309853 A1 | 10/2014 | Ricci |
| 2014/0309862 A1 | 10/2014 | Ricci |
| 2014/0309863 A1 | 10/2014 | Ricci |
| 2014/0309864 A1 | 10/2014 | Ricci |
| 2014/0309865 A1 | 10/2014 | Ricci |
| 2014/0309866 A1 | 10/2014 | Ricci |
| 2014/0309867 A1 | 10/2014 | Ricci |
| 2014/0309868 A1 | 10/2014 | Ricci |
| 2014/0309869 A1 | 10/2014 | Ricci |
| 2014/0309870 A1 | 10/2014 | Ricci et al. |
| 2014/0309871 A1 | 10/2014 | Ricci |
| 2014/0309872 A1 | 10/2014 | Ricci |
| 2014/0309873 A1 | 10/2014 | Ricci |
| 2014/0309874 A1 | 10/2014 | Ricci |
| 2014/0309875 A1 | 10/2014 | Ricci |
| 2014/0309876 A1 | 10/2014 | Ricci |
| 2014/0309877 A1 | 10/2014 | Ricci |
| 2014/0309878 A1 | 10/2014 | Ricci |
| 2014/0309879 A1 | 10/2014 | Ricci |
| 2014/0309880 A1 | 10/2014 | Ricci |
| 2014/0309885 A1 | 10/2014 | Ricci |
| 2014/0309886 A1 | 10/2014 | Ricci |
| 2014/0309891 A1 | 10/2014 | Ricci |
| 2014/0309892 A1 | 10/2014 | Ricci |
| 2014/0309893 A1 | 10/2014 | Ricci |
| 2014/0309913 A1 | 10/2014 | Ricci et al. |
| 2014/0309919 A1 | 10/2014 | Ricci |
| 2014/0309920 A1 | 10/2014 | Ricci |
| 2014/0309921 A1 | 10/2014 | Ricci et al. |
| 2014/0309922 A1 | 10/2014 | Ricci |
| 2014/0309923 A1 | 10/2014 | Ricci |
| 2014/0309927 A1 | 10/2014 | Ricci |
| 2014/0309929 A1 | 10/2014 | Ricci |
| 2014/0309930 A1 | 10/2014 | Ricci |
| 2014/0309934 A1 | 10/2014 | Ricci |
| 2014/0309935 A1 | 10/2014 | Ricci |
| 2014/0309982 A1 | 10/2014 | Ricci |
| 2014/0310031 A1 | 10/2014 | Ricci |
| 2014/0310075 A1 | 10/2014 | Ricci |
| 2014/0310103 A1 | 10/2014 | Ricci |
| 2014/0310186 A1 | 10/2014 | Ricci |
| 2014/0310277 A1 | 10/2014 | Ricci |
| 2014/0310379 A1 | 10/2014 | Ricci et al. |
| 2014/0310594 A1 | 10/2014 | Ricci et al. |
| 2014/0310610 A1 | 10/2014 | Ricci |
| 2014/0310702 A1 | 10/2014 | Ricci et al. |
| 2014/0310739 A1 | 10/2014 | Ricci et al. |
| 2014/0310788 A1 | 10/2014 | Ricci |
| 2014/0322676 A1 | 10/2014 | Raman |
| 2014/0347207 A1 | 11/2014 | Zeng et al. |
| 2014/0347265 A1 | 11/2014 | Allen et al. |
| 2015/0007155 A1 | 1/2015 | Hoffman et al. |
| 2015/0012186 A1 | 1/2015 | Horseman |
| 2015/0032366 A1 | 1/2015 | Man et al. |
| 2015/0032670 A1 | 1/2015 | Brazell |
| 2015/0057839 A1 | 2/2015 | Chang et al. |
| 2015/0061895 A1 | 3/2015 | Ricci |
| 2015/0081133 A1 | 3/2015 | Schulz |
| 2015/0081167 A1 | 3/2015 | Pisz et al. |
| 2015/0088423 A1 | 3/2015 | Tuukkanen |
| 2015/0088515 A1 | 3/2015 | Beaumont et al. |
| 2015/0116200 A1 | 4/2015 | Kurosawa et al. |
| 2015/0158499 A1 | 6/2015 | Koravadi |
| 2015/0178034 A1 | 6/2015 | Penilla et al. |
| 2015/0254986 A1* | 9/2015 | Fairfield .......... G08G 1/22 707/687 |
| 2016/0008985 A1 | 1/2016 | Kim et al. |
| 2016/0070527 A1 | 3/2016 | Ricci |
| 2016/0086391 A1 | 3/2016 | Ricci |
| 2016/0269456 A1 | 9/2016 | Ricci |
| 2016/0269469 A1 | 9/2016 | Ricci |
| 2017/0192423 A1* | 7/2017 | Rust .......... G05D 1/0038 |
| 2017/0268896 A1 | 9/2017 | Bai et al. |
| 2017/0270375 A1* | 9/2017 | Grauer .......... G01S 17/107 |

FOREIGN PATENT DOCUMENTS

| | | |
|---|---|---|
| CN | 101303878 | 11/2008 |
| CN | 102467827 | 5/2012 |
| EP | 1223567 | 7/2002 |
| EP | 1484729 | 12/2004 |
| EP | 2192015 | 6/2010 |
| JP | 2004-284450 | 10/2004 |
| KR | 2006-0128484 | 12/2006 |
| WO | WO 2007/126204 | 11/2007 |
| WO | WO 2012/102879 | 8/2012 |

(56) References Cited

FOREIGN PATENT DOCUMENTS

| WO | WO 2013/074866 | 5/2013 |
|---|---|---|
| WO | WO 2013/074867 | 5/2013 |
| WO | WO 2013/074868 | 5/2013 |
| WO | WO 2013/074897 | 5/2013 |
| WO | WO 2013/074899 | 5/2013 |
| WO | WO 2013/074901 | 5/2013 |
| WO | WO 2013/074919 | 5/2013 |
| WO | WO 2013/074981 | 5/2013 |
| WO | WO 2013/074983 | 5/2013 |
| WO | WO 2013/075005 | 5/2013 |
| WO | WO 2013/181310 | 12/2013 |
| WO | WO 2014/014862 | 1/2014 |
| WO | WO 2014/143563 | 9/2014 |
| WO | WO 2014/158667 | 10/2014 |
| WO | WO 2014/158672 | 10/2014 |
| WO | WO 2014/158766 | 10/2014 |
| WO | WO 2014/172312 | 10/2014 |
| WO | WO 2014/172313 | 10/2014 |
| WO | WO 2014/172316 | 10/2014 |
| WO | WO 2014/172320 | 10/2014 |
| WO | WO 2014/172322 | 10/2014 |
| WO | WO 2014/172323 | 10/2014 |
| WO | WO 2014/172327 | 10/2014 |
| WO | WO 2016/145073 | 9/2016 |
| WO | WO 2016/145100 | 9/2016 |

OTHER PUBLICATIONS

U.S. Appl. No. 15/366,615, filed Dec. 1, 2016, Newman.
U.S. Appl. No. 15/366,628, filed Dec. 1, 2016, Newman.
"Nexus 10 Guidebook for Android," Google Inc., © 2012, Edition 1.2, 166 pages.
"Self-Driving: Self-Driving Autonomous Cars," available at http://www.automotivetechnologies.com/autonomous-self-driving-cars, accessed Dec. 2016, 9 pages.
Amor-Segan et al., "Towards the Self Healing Vehicle," Automotive Electronics, Jun. 2007, 2007 3rd Institution of Engineering and Technology Conference, 7 pages.
Bennett, "Meet Samsung's Version of Apple AirPlay," CNET.com, Oct. 10, 2012, 11 pages.
Cairnie et al., "Using Finger-Pointing to Operate Secondary Controls in Automobiles," Proceedings of the IEEE Intelligent Vehicles Symposium 2000, Oct. 3-5, 2000, 6 pages.
Chen et al., "Learning-based spatio-temporal vehicle tracking and indexing for transportation multimedia database systems," IEEE Transactions on Intelligent Transportation Systems, 2003, vol. 4(3), pp. 154-167.
Clark, "How Self-Driving Cars Work: The Nuts and Bolts Behind Google's Autonomous Car Program," Feb. 21, 2015, available at http://www.makeuseof.com/tag/how-self-driving-cars-work-the-nuts-and-bolts-behind-googles-autonomous-car-program/, 9 pages.
Dantcheva et al., "Bag of Soft Biometrics for Person Identification," Multimedia Tools and Applications, Jan. 11, vol. 51(2), pp. 739-777.
Deaton, et al., "How Driverless Cars Will Work," Jul. 1, 2008, HowStuffWorks.com. <http://auto.howstuffworks.com/under-the-hood/trends-innovations/driverless-car.htm> Sep. 18, 2017, 10 pages.
Dumbaugh, "Safe Streets, Livable Streets: A Positive Approach to urban Roadside Design," Ph.D. dissertation for School of Civil & Environ. Engr., Georgia Inst. of Technology, Dec. 2005, 235 pages.
Eriksson et al., "The Pothole Patrol," Proceeding of the 6th International Conference on Mobile Systems, Applications, and Services—MobiSys '08, 2008, 11 pages.
Fei et al., "A QoS-aware Dynamic Bandwidth Allocation Algorithm for Relay Stations in IEEE 802.16j-based Vehicular Networks," Proceedings of the 2010 IEEE Global Telecommunications Conference, Dec. 10, 2010, 10 pages.
Gandhi et al., "Person Tracking and Reidentification: Introducing Panoramic Appearance Map (PAM) for Feature Representation" Machine Vision and Applications, 2007, vol. 18(3-4), pp. 207-220.
Ge et al., "Optimal Relay Selection in IEEE 802.16j Multihop Relay Vehicular Networks," IEEE Transactions on Vehicular Technology, 2010, vol. 59(5), pp. 2198-2206.
Guizzo, Erico, "How Google's Self-Driving Car Works," Oct. 18, 2011, available at https://spectrum.ieee.org/automaton/robotics/artificial-intelligence/how-google-self-driving-car-works, 5 pages.
Heer et al., "ALPHA: An Adaptive and Lightweight Protocol for Hop-by-hop Authentication," Proceedings of CoNEXT 2008, Dec. 2008, pp. 1-12.
Jahanshahi et al. "A Survey and Evaluation of Promising Approaches for Automatic Image-based Defect Detection of Bridge Structures," Structure and Infrastructure Engineering, 2009, vol. 5(6), pp. 455-486.
Jahnich et al., "Towards a Middleware Approach for a Self-Configurable Automotive Embedded System," International Federation for Information Processing, 2008, pp. 55-65.
Koch et al., "Pothole Detection in Asphalt Pavement Images," Advanced Engineering Informatics, 2011, vol. 25(3), pp. 507-515
Moghaddam et al., "Bayesian face recognition," Pattern Recognition, 2000, vol. 33(11), pp. 1771-1782.
Nakajima et al., "Full-body Person Recognition System," Pattern Recognition, Jan. 2003, vol. 36(9), pp. 1997-2006.
Ozbay et al., "Automatic vehicle identification by plate recognition," World Academy of Science, Engineeiing and Technology, 2005, vol. 9(41), pp. 222-225.
Persson "Adaptive Middleware for Self-Configurable Embedded Real-Time Systems," KTH Industrial Engineering and Management, 2009, pp. iii-71 and references.
Raychaudhuri et al., "Emerging Wireless Technologies and the Future Mobile Internet," p. 48, Cambridge Press, 2011, 3 pages.
Shan et al., "Vehicle Identification between Non-overlapping Cameras without Direct Feature Matching," Tenth IEEE International Conference on Computer Vision (ICCV'05), 2005, vol. 1, n. pag.
Sharma et al., "Detection of Inclement Weather Conditions at a Signalized Intersection Using a Video Image Processing Algorithm," 2006 IEEE 12th Digital Signal Processing Workshop & 4th IEEE Signal Processing Education Workshop, 2006, 6 pages.
Song, Beibei, "Statistics Properties of Asphalt Pavement Images for Cracks Detection," Journal of Information and Computational Science, 2013, vol. 10(9), pp. 2833-2843.
Stephens, Leah, "How Driverless Cars Work," Interesting Engineering, Apr. 28, 2016, available at https://interestingengineering.com/driverless-cars-work/, 7 pages.
Stoller, "Leader Election in Distributed Systems with Crash Failures," Indiana University, 1997, pp. 1-15.
Strunk et al., "The Elements of Style," 3d ed., Macmillan Publishing Co., 1979, 3 pages.
Suwatthikul, "Fault detection and diagnosis for in-vehicle networks," Intech, 2010, pp. 283-286 [retrieved from: www.intechopen.com/books/fault-detection-and-diagnosis-for-in-vehicle-networks].
Tai et al., "Real-time Image Tracking for Automatic Traffic Monitoring and Enforcement Applications," Image and Vision Computing, 2004, vol. 22(6), pp. 485-501.
Walter et al., "The smart car seat: personalized monitoring of vital signs in automotive applications." Personal and Ubiquitous Computing, Oct. 2011, vol. 15, No. 7, pp. 707-715.
Wang, Xiaogang, "Intelligent Multi-camera Video Surveillance: A Review," Pattern Recognition Letters, 2013, vol. 34(1), pp. 3-19.
Wolf et al., "Design, Implementation, and Evaluation of a Vehicular Hardware Security Module," ICISC'11 Proceedings of the 14th Int'l Conf. Information Security & Cryptology, Springer-Verlag Berlin, Heidelberg, 2011, pp. 302-318.
Wu et al., "Viewpoint Invariant Human Re-Identification in Camera Networks Using Pose Priors and Subject-Discriminative Features," IEEE Transactions on Pattern Analysis and Machine Intelligence, May 2015, vol. 37(5), pp. 1095-1108.
Ying, Jiang. "Highway Traffic Automatic Detection System Based on Video and Image Processing," Intelligence Computation and Evolutionary Computation Advances in Intelligent Systems and Computing, 2013, pp. 521-526.
Zhang et al., "Video-Based Vehicle Detection and Classification System for Real-Time Traffic Data Collection Using Uncalibrated

(56) References Cited

OTHER PUBLICATIONS

Video Cameras," Transportation Research Record: Journal of the Transportation Research Board 1993, 2007, pp. 138-147.

Zou et al., "Image Sequences Based Traffic Incident Detection for Signaled Intersections Using HMM," 2009 Ninth International Conference on Hybrid Intelligent Systems, 2009, 5 pages.

Curio et al., "Walking Pedestrian Recognition", IEEE Transactions on Intelligent Transportation Systems 1.3 (2000): 155-163.

Kumar et al., "Framework for Real-Time Behavior Interpretation From Traffic Video", IEEE Transactions on Intelligent Transportation Systems 6.1 (2005): 43-53.

Gandhi et al., "Pedestrian Protection Systems: Issues, Survey, and Challenges", IEEE Transactions on Intelligent Transportation Systems 8.3 (2007): 413-430.

Junoh et al., "Crime Detection With ICA and Artificial Intelligent Approach", AMR Advanced Materials Research 816-817 (2013): 616-622.

Moradi et al., "A Real-Time Wall Detection Method for Indoor Environments", 2006 IEEE/RSJ International Conference on Intelligent Robots and Systems (2006): n. pag.

Official Action for U.S. Appl. No. 15/366,615, dated Aug. 27, 2018 8 pages, Restriction Requirement.

Official Action for U.S. Appl. No. 15/366,628, dated Aug. 28, 2018 6 pages, Restriction Requirement.

Official Action for U.S. Appl. No. 15/366,615, dated Jan. 14, 2019 16 pages.

Official Action for U.S. Appl. No. 15/366,628, dated Nov. 27, 2018 14 pages.

Notice of Allowance for U.S. Appl. No. 15/366,615, dated Apr. 29, 2019 10 pages.

Final Action for U.S. Appl. No. 15/366,628, dated May 3, 2019 14 pages.

U.S. Appl. No. 15/366,615, filed Dec. 1, 2016.

U.S. Appl. No. 15/366,628, filed Dec. 1, 2016.

Official Action for U.S. Appl. No. 15/366,628, dated Nov. 20, 2019 14 pages.

\* cited by examiner

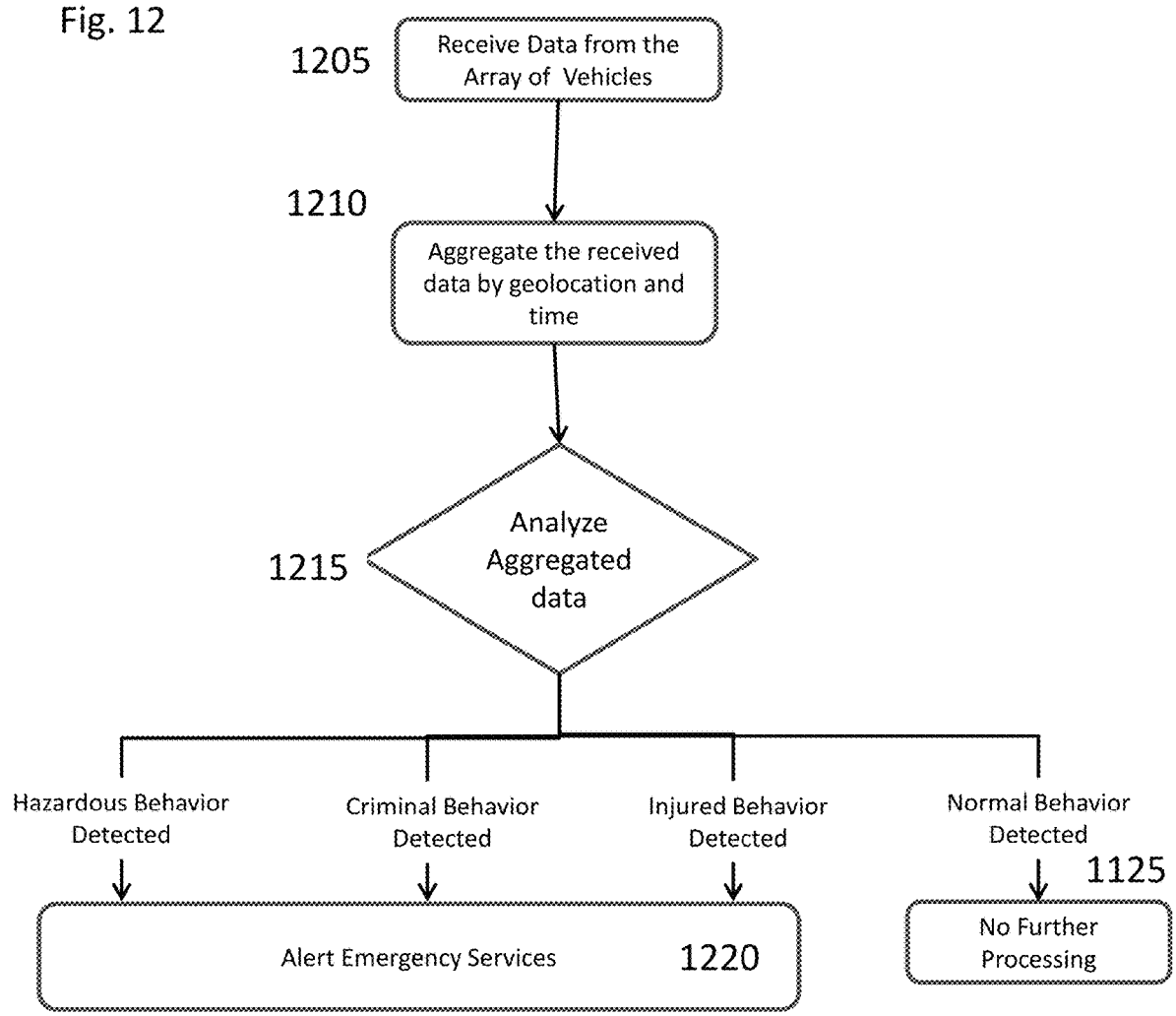

USING VEHICLE SENSOR DATA TO MONITOR PEDESTRIAN HEALTH

This application claims the benefit of U.S. Provisional Application No. 62/420,985 having a filing date of Nov. 11, 2016 which is incorporated by reference as if fully set forth.

BACKGROUND

There are currently an estimated 260 million cars in the United States that drive annually a total of 3.2 trillion miles. Each modern car has upwards of 200 sensors. As a point of reference, the Sojourner Rover of the Mars Pathfinder mission had only 12 sensors, traveled a distance of just over 100 meters mapping the Martian surface, and generated 2.3 billion bits of information including 16,500 pictures and made 8.5 million measurements. Therefore, there is an unrealized potential to utilize the over 200 sensors on the 260 million cars to collect detailed information about our home planet.

BRIEF DESCRIPTION OF THE DRAWINGS

A more detailed understanding may be had from the following description, given by way of example in conjunction with the accompanying drawings wherein:

FIG. 12 is a block diagram for a process of monitoring pedestrians.

DETAILED DESCRIPTION OF THE PREFERRED EMBODIMENTS

A wide array of sensors is required for the modern operation of a motor vehicle. These sensors are required for the vehicle to navigate, avoid collisions with other cars, and adjust the operating parameters of the drive systems. However, the data collected by these sensors is confined to the vehicle, is ephemeral and is only used locally in the vehicle. The present disclosure provides a system which utilizes the data already being collected by the motor vehicle to convert the motor vehicle into a rolling laboratory for monitoring pedestrians. Further, the system aggregates the data collected from a plurality of vehicles so that differential measurements can be performed on the same pedestrian from multiple perspectives and over multiple time periods.

Advanced driver assistance systems (ADAS) automate and enhance the safety system of a vehicle and provide a more pleasurable driving experience. Examples of ADAS systems currently available include Adaptive Cruise Control, Lane Departure Warning Systems, Blind Spot Detectors, and Hill Decent Control. In order to implement these systems, a wide array of sensors is required.

The present scheme includes a network of cars, each equipped with an ADAS system, that are constantly collecting data about the environment surrounding the vehicle. This collected information is then analyzed by a vehicle computer. The vehicle computer then determines if a pedestrian is displaying hazardous, criminal, injured or normal behavior. Then, based on the determined behavior, the computer may transmit data to a server and contact emergency service officials.

Figure 1:
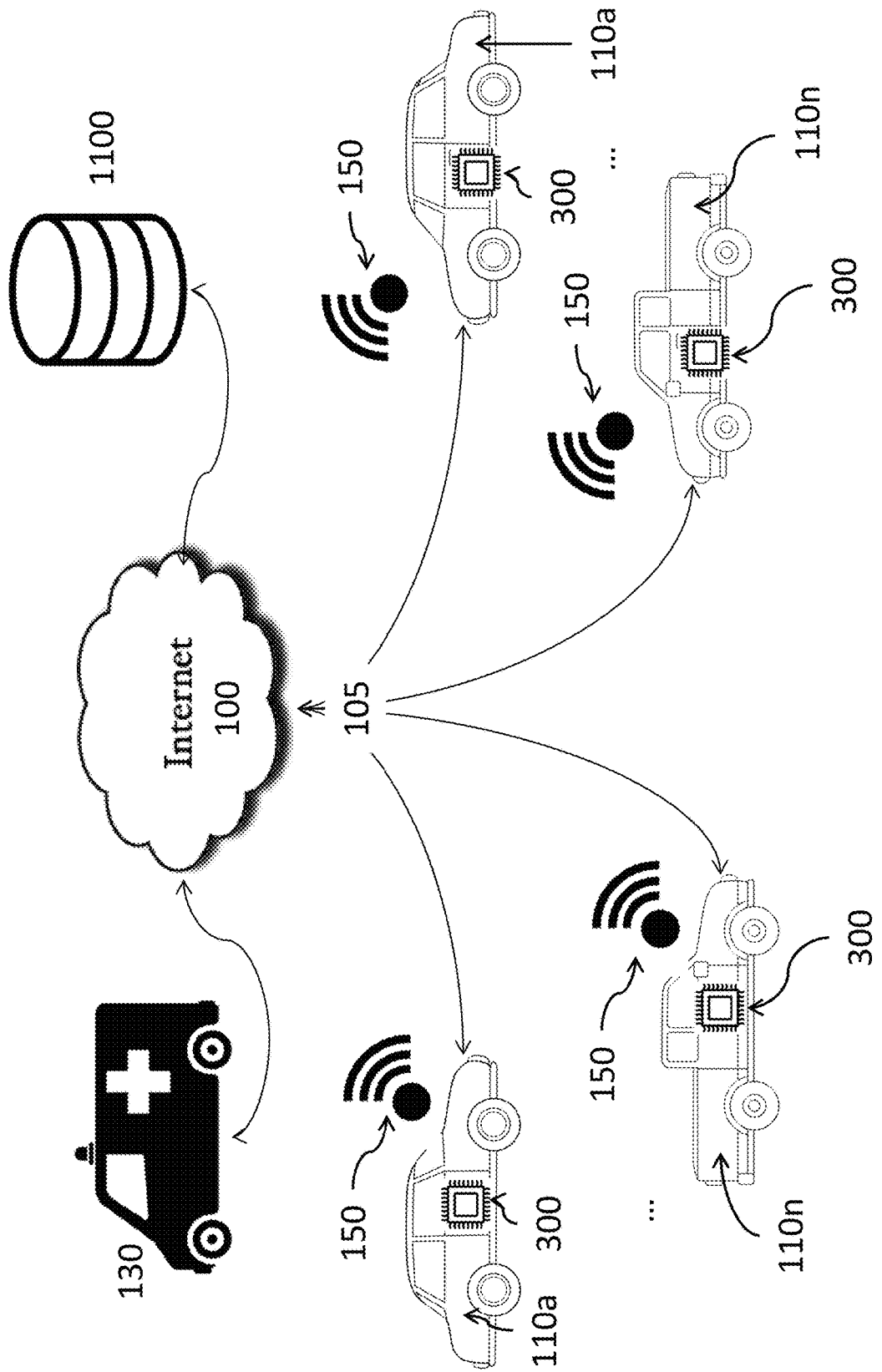
FIG. 1 is an example system that uses a network of vehicles to monitor pedestrians.

FIG. 1 depicts a diagram of an example system practicing the method of monitoring pedestrians. In the system, an array of vehicles 110A . . . 110B may be communicatively coupled to a database server 1100 and be connected to the Internet 100 via a wireless channel 105. The wireless communication channels 105 may be of the form of any wireless communication mechanism such as LTE, 3G, WiMax etc.

Each vehicle in the array of vehicles 110A . . . 110B may contain a vehicle computer (VC) 300 that is communicatively coupled to a plurality of sensors 150. The sensors 150 may include thermal imagers, LIDAR, radar, ultrasonic and high definition (HD) cameras. In addition, sensors 150 may also include air quality, temperature, radiation, magnetic field and pressure that are used to monitor various systems of the vehicle.

Both the array of vehicles 110A . . . 110B and the database server 1100 may communicate with emergency services providers 130 over the Internet. The emergency services providers 130 may include fire, police or medical services.

Figure 2:
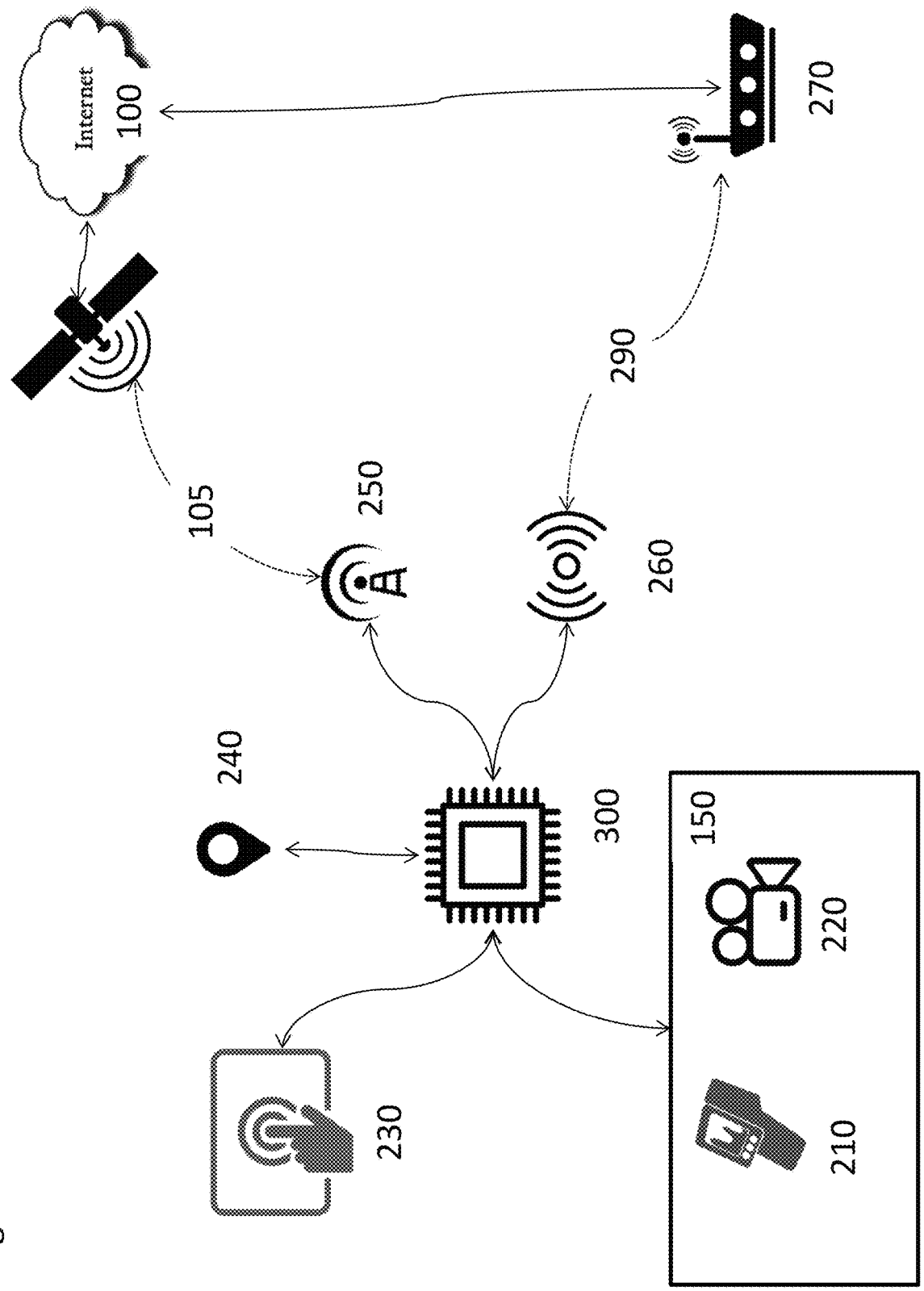
FIG. 2 is a communication diagram for a vehicle.

The communicative connections of the VC 300 are graphically shown in FIG. 2. The VC 300 is communicatively coupled to a user interface 230. The VC 300 may instruct the user interface 230 to display information stored in the memory 310 or storage 320 of the VC 300. In addition, the VC 300 may instruct the user interface 230 to display alert messages. The user interface 230 may include a touch screen that enables the user to input information to the VC 300. The user interface 230 may be a discrete device or integrated into an existing vehicle entertainment or navigation system.

The VC 300 may also be able to communicate with the Internet 100 via a wireless communication channel 105. A database server 1100 is also connected to the Internet 100 via communication channel 125. It should be understood that the Internet 100 may represent any network connection between respective components.

The VC 300 is also communicatively coupled to a real time communication interface 250. The real time communication interface 250 enables the VC 300 to access the Internet 100 over wireless communication channel 105. This enables the VC 300 to store and retrieve information stored in database server 1100 in real time. The real time communication interface 250 may include one or more antennas, receiving circuits, and transmitting circuits. The wireless communication channel 105 provides near real time communication of the VC 300 to the database while the vehicle is in motion.

Additionally, the VC 300 may communicate with the Internet 100 through short range wireless interface 260 over wireless communication channel 210 via an access point 270. Wireless channel 210 may be 802.11 (WiFi), 802.15 (Bluetooth) or any similar technology. Access point 270 may be integrated in the charging unit of an electric vehicle, located at a gas refueling station, or be located in an owner's garage. The wireless channel 210 allows the VC 300 to quickly and cheaply transmit large amounts of data when the vehicle is not in motion and real time data transmission is not required.

When the VC 300 detects that the short range wireless interface 260 is connected to the Internet 1100, the VC 300 transmits the data stored in storage 320 to the database 1100 over wireless channel 210. The VC 300 may then delete the data stored in storage 320.

The VC 300 may also be communicatively linked to a geo locating system 240. The geolocating system 240 is able to determine the location of the vehicle 110 based on a locating standard such as the Global Positioning System (GPS) or Galileo.

The VC 300 may also be communicatively linked to the plurality of sensors 150. The plurality of sensors may include one or more thermal imager 210 and one or more high definition camera 220. The thermal imager 210 may include any form of thermographic cameras such as a Forward Looking Infrared (FLIR) camera. The high definition cameras 220 may include any form of digital imaging device that captures images in the visible light spectrum.

Figure 3:
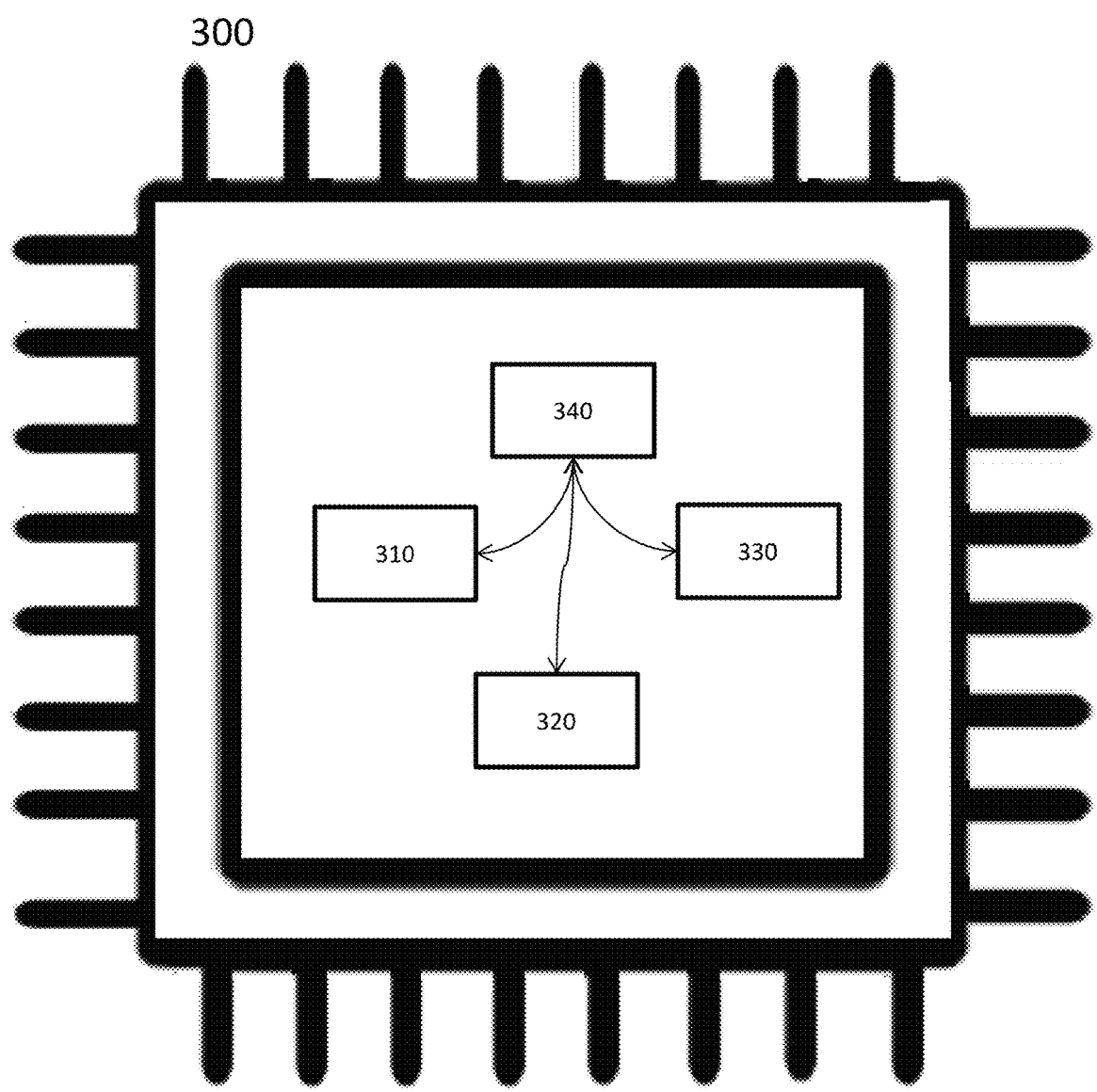
FIG. 3 is a block diagram of the electric vehicle computer.

FIG. 3 depicts a block diagram of the VC 300. The VC 300 includes an Input/Output interface 330. The Input/Output interface 330 may facilitate communication of data with the plurality of sensors 150, user interface 230, geo locating system 240, real time communication interface 250 and short range wireless interface 260. The VC 800 also includes a processor 330 that is communicatively linked to the Input/Output interface 330, the memory 310 and the storage 320. The storage 320 may be a hard disk drive, solid state drive or any similar technology for the nonvolatile storage and retrieval of data.

Figure 4:
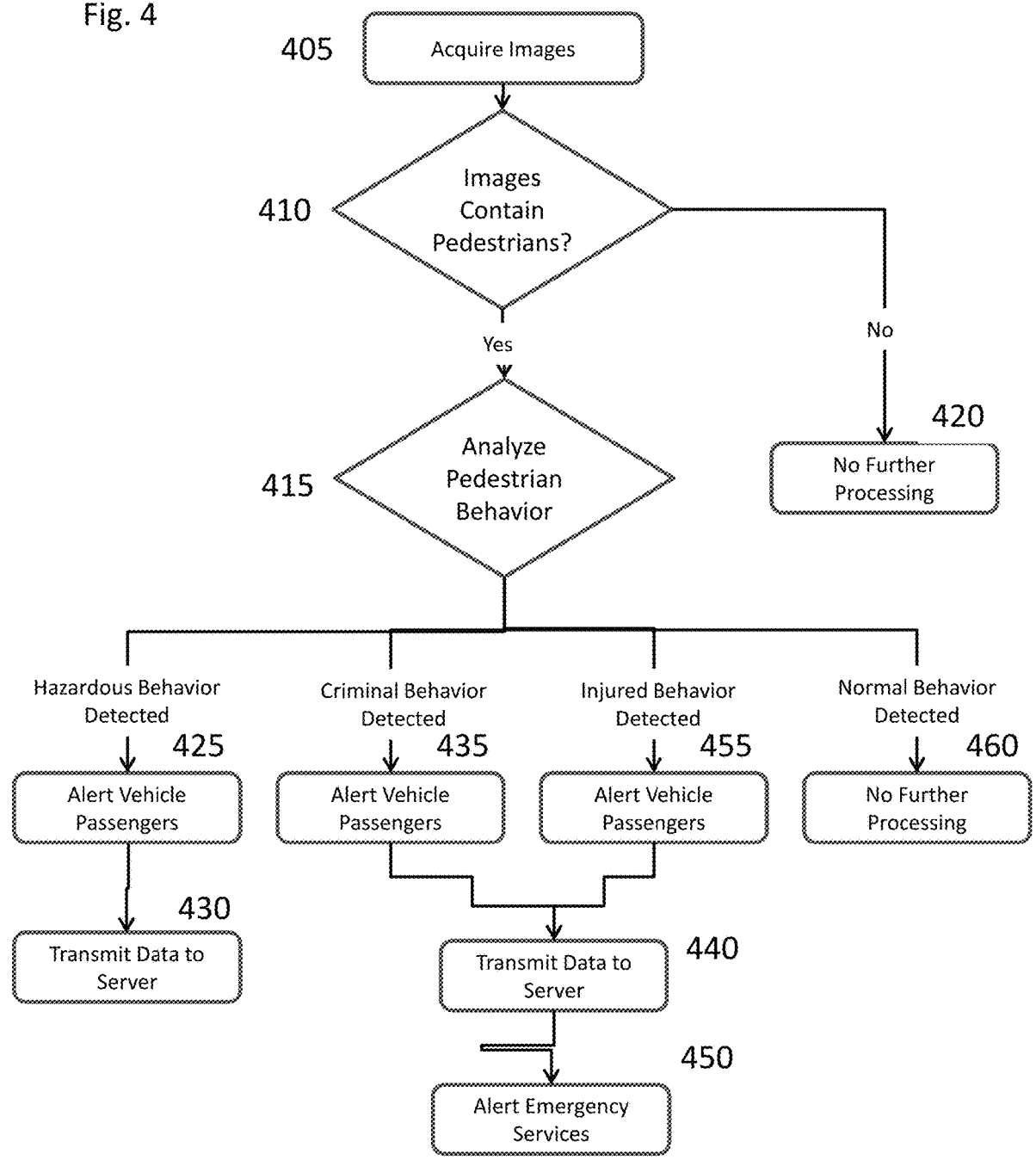
FIG. 4 is a block diagram for a process of monitoring pedestrians.

FIG. 4 depicts a method for monitoring the pedestrians that may be implemented by the processor 330. A plurality of images is acquired (405) from the thermal imager 210 and the HD camera 220. For example, vehicle 110 will acquire the plurality of images of objects within Bubbles of Vision 515, 525 and 535. The bubble of vision will include areas directly in front of the vehicle 110, behind the vehicle and along the sides of the vehicle. The area alongside the vehicle may include other vehicle travel lanes, pedestrian sidewalks or any other area adjacent to the path of the vehicle. The acquired images are then analyzed (410) to determine if the images contain a pedestrian.

Figure 13B:
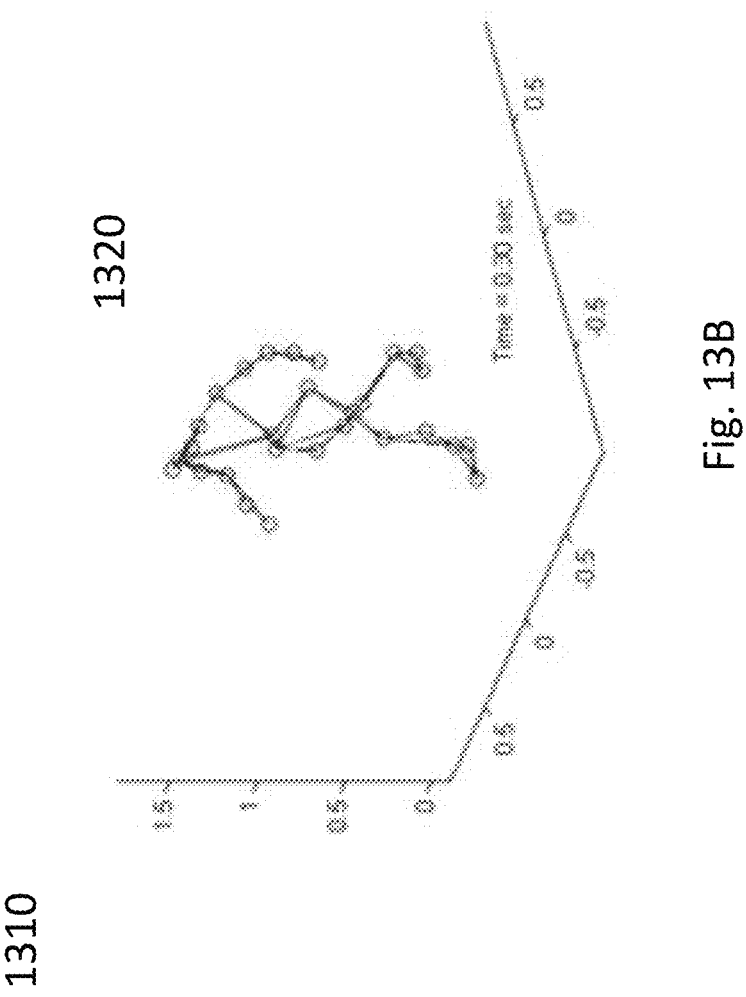
FIG. 13B is a kinematic model of a person.
Figure 13A:
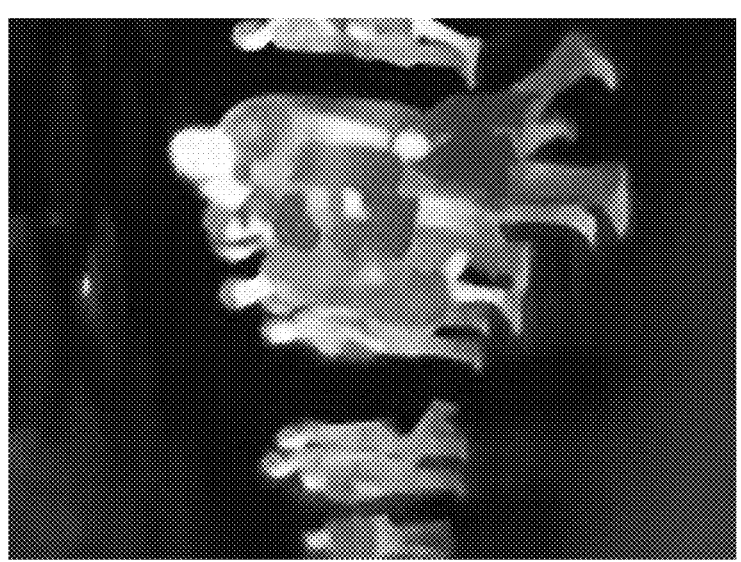
FIG. 13A is a thermal profile of a person.

In an embodiment, pedestrians are determined based upon a comparison of the thermal profiles. A human being is a unique thermal profile 1310 as shown in FIG. 13A. Methods of detecting a person based on a thermal profile are well known in the art. For instance, U.S. Pat. No. 8,355,839 for a "Vehicle vision system with night vision function", which is hereby incorporated herein by reference, teaches an example method that may be implemented. As a result of the thermal profile, the system is able to determine and differentiate the movement of inanimate objects and animals from that of a person based upon this unique thermal profile.

In another embodiment, pedestrians are determined as being present based upon the development of a kinematic model. There is a unique kinematic profile 1320 as shown in FIG. 13B for a walking person. Methods for detecting a pedestrian based on this unique kinematic profile are well known in the art. For instance, "Walking Pedestrian Recognition" by Curio et al. (Curio, C., J. Edelbrunner, T. Kalinke, C. Tzomakas, and W. Von Seelen. "Walking Pedestrian Recognition." IEEE Transactions on Intelligent Transportation Systems 1.3 (2000): 155-63),", which is hereby incorporated herein by reference, teaches an example method of identifying a pedestrian based on a kinematic model that may be implemented by the system. The implementation of these methods enable the system to determine if a moving object is a pedestrian or some other object that does not require additional analysis.

If the images are determined to not contain a pedestrian, no further processing of the images is required (420), and the acquired images are stored in the storage 320. However, if one or more pedestrians are detected, the images are analyzed to determine if the pedestrian behavior (415) matches a predetermined pedestrian behavior. Methods for determining pedestrian behavior that may be implemented by the system include "Framework for Real-Time Behavior Interpretation From Traffic Video." (Kumar, P., S. Ranganath, H. Weimin, and K. Sengupta. "Framework for Real-Time Behavior Interpretation From Traffic Video." IEEE Transactions on Intelligent Transportation Systems 6.1 (2005): 43-53)) and "Pedestrian Protection Systems: Issues, Survey, and Challenges" (Gandhi, T., and M.m. Trivedi. "Pedestrian Protection Systems: Issues, Survey, and Challenges." IEEE Transactions on Intelligent Transportation Systems 8.3 (2007): 413-30), both of which are hereby incorporated herein by reference.

If the analysis of the images reveals the pedestrian is engaged in hazardous behavior, the driver is alerted (425) via the user interface 230, and the acquired images, time and the location of the vehicle 110 are transmitted (430) to the database server 1100 using the real time communication interface 250. Examples of hazardous behavior may include a child playing in traffic, a person jay walking, or a person chasing after a ball.

For example, the vehicle 110 may acquire images of a small child because the small child is playing on a sidewalk or driveway adjacent to the roadway. The vehicle will acquire images of the small child because the sidewalk or driveway is located within the Bubble of Vision 515. In step 410, the small child will be identified as a pedestrian and the small child's behavior will be analyzed 415 and the analysis may reveal that the child is playing with a ball. A small child playing with a ball adjacent to traveling path of the vehicle 110 will be determined by the system to be a "Hazardous Behavior." Specifically, the system may recognize that a small child may suddenly run after a ball into the roadway. Accordingly, the system may alert the occupants of the vehicle (425) of the small child and transmit the data (430) to the database server 1100. The database server 1100 may use this information to notify other vehicles traveling in the area to the hazard of the child playing near the roadway.

If the analysis of the images (415) reveals potentially criminal behavior, the driver is alerted to the potentially criminal behavior (435) via the user interface 230. Additionally the images, time, and location information is transmitted (440) to the database server 1100 using the real time communication interface 250. Additionally, emergency services 130 are alerted (450) using the real time communication interface 250. The alert to law enforcement may include the acquired images, the time and location information, as well as an identification of the suspected behavior. Potentially criminal behavior could include a physical assault, purse snatching, or the displaying of weapons. In addition, the criminal behavior may include drug dealing or prostitution.

Methods for analyzing an image to determine criminal behavior may include U.S. Pat. No. 5,666,157 for an "Abnormality detection and surveillance system" and "Crime Detection with ICA and Artificial Intelligent Approach" (Junoh, Ahmad Kadri, Muhammad Naufal Mansor, Alezar Mat Ya'acob, Farah Adibah Adnan, Syafawati Ab. Saad, and Nornadia Mohd Yazid. "Crime Detection with ICA and Artificial Intelligent Approach." AMR Advanced Materials Research 816-817 (2013): 616-22.) which are hereby incorporated herein by reference.

For example, a vehicle 110 may acquire an image of a sidewalk located at a particular street corner as the vehicle is driving along a roadway. The vehicle will acquire images of the street corner because the street corner lies within the Bubbles of Vision 515. The system may identify that a person is standing on the street corner in step 410. A person standing on a street corner is not by itself a criminal behavior, therefore the single observation of the person standing on a corner would be determined to be "Normal Behavior" and no further processing would be required, and the information would be sent to the database server 1100 over the short range communication channel 290. However, if multiple vehicles observe the same person standing on the same particular street corner for an extended period of time (for example, greater than 30 minutes), the database server 1100 may identify this as criminal behavior. The system would identify this as criminal behavior because an individual standing on a street corner for an extended period of time is consistent with the person being a drug dealer. Once the potential drug dealer was identified, emergency services 130 may be contacted by the system in step 450.

If the analysis of the images (415) reveals a potentially injured pedestrian behavior, the driver is alerted to the potentially injured individual (455) via the user interface 230. Additionally the images, time, and location information is transmitted (440) to the database server 1100 using the real time communication interface 250. Additionally, emergency services 130 are alerted (450) using the real time communication interface 250. The alert to law enforcement may include the acquired images, the time and location information, as well as an identification of the suspected behavior. A potentially injured pedestrian may be identified by an individual falling, lying on the ground, or displaying a highly elevated thermal profile.

Example methods that may be implemented to determine that the pedestrian is injured may include "A Real-Time Wall Detection Method for Indoor Environments" (Moradi, Hadi, Jongmoo Choi, Eunyoung Kim, and Sukhan Lee. "A Real-Time Wall Detection Method for Indoor Environments." 2006 IEEE/RSJ International Conference on Intelligent Robots and Systems (2006): n. pag.)

For example, a vehicle 110 may acquire an image of a sidewalk because it is located in the Bubble of Vision 115. A person who is having a heart attack who was previously walking on the sidewalk would be included in images that are acquired by the system. The system may determine that the person is having a heart attack based on their thermal profile or by detecting that the person is lying on the sidewalk. The system would detect a person having a heart attack is an "Injured Pedestrian Behavior." Accordingly, the system would alert the occupants of the vehicle (455) and send (450) an alert to emergency services 130.

If the analysis of the images (415) reveals normal pedestrian behavior, no further processing is required, (460) and the images are stored in the storage 320.

Figure 5:
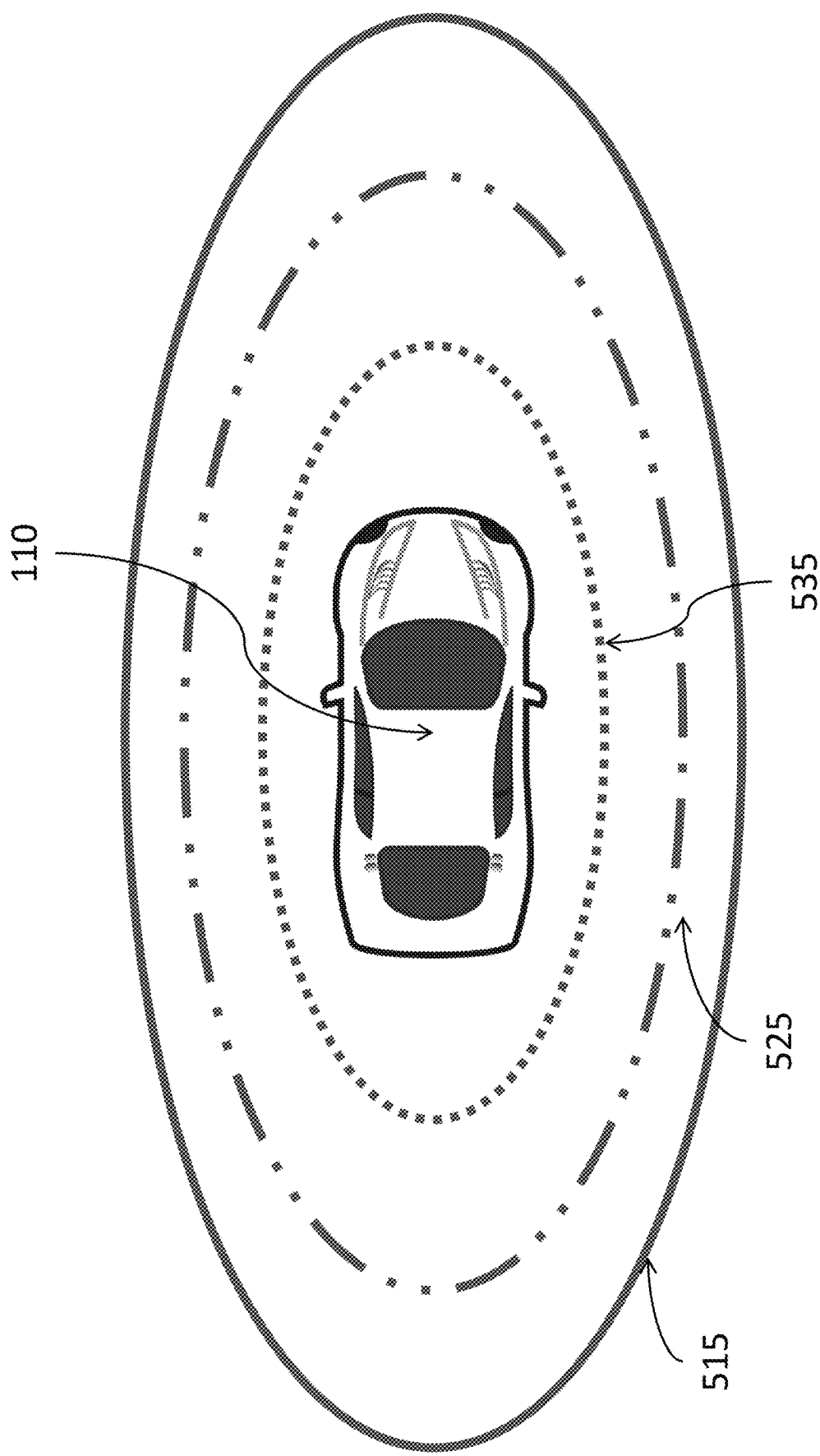
FIG. 5 is an illustration of the "Bubbles of Vision" of a vehicle.

FIG. 5 depicts various "Bubbles of Vision" associated with the different sensors 150. For example, certain sensors have a higher resolution and limited sensing distance 535 from the vehicle 110. Other sensors have a much longer sensing range but have lower resolution 515. Yet other sensors operate in a medium sensing distance and resolution 525. Although only discrete Bubbles are shown, a person of ordinary skill would understand that any number of layers can be included. Further, the Bubbles are shown depicted as oval merely for convenience, and the sensors 150 may produce sensing ranges of any shape.

Figure 6:
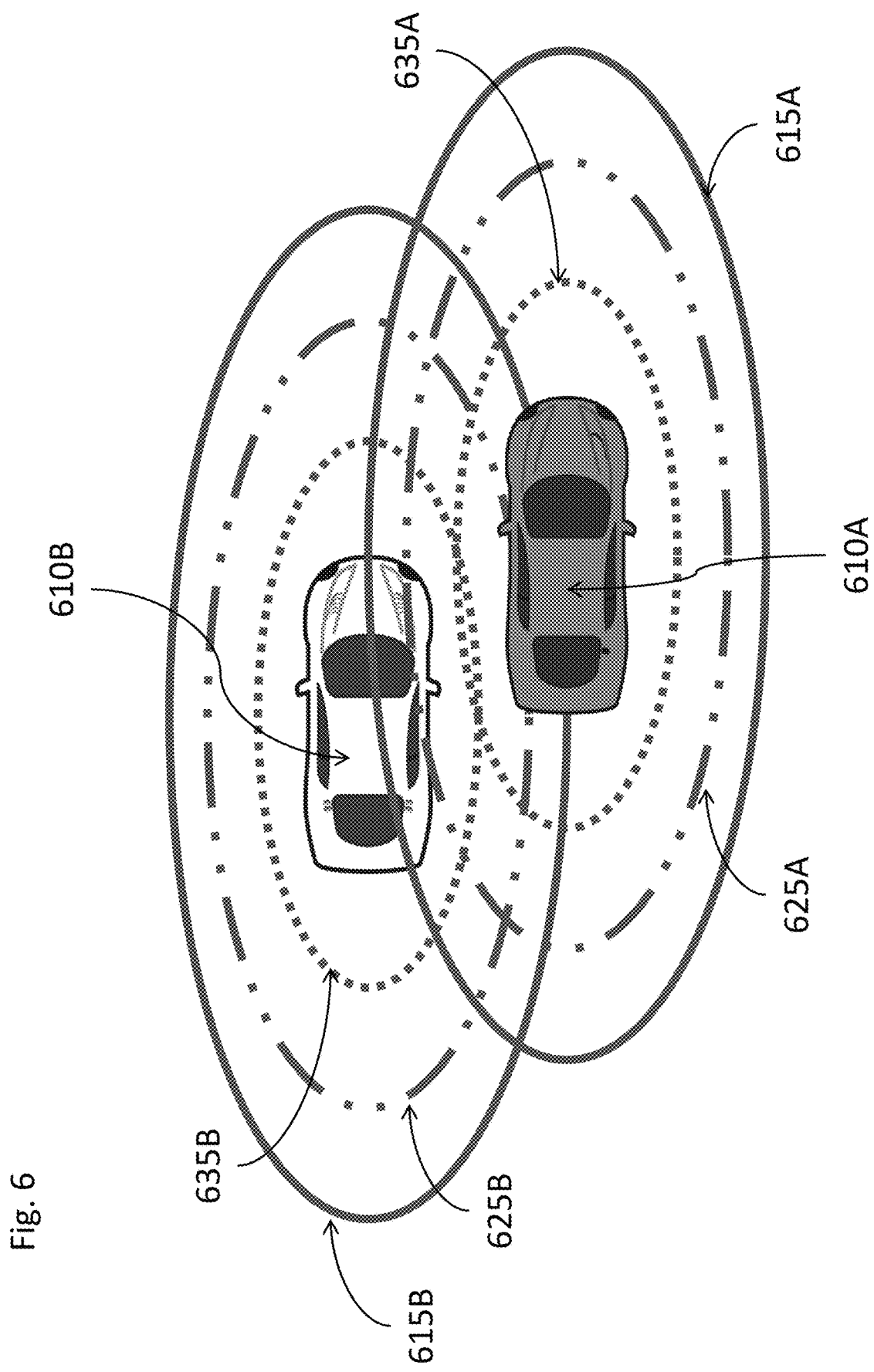
FIG. 6 is an illustration of the interaction of the "Bubbles of Vision" of two vehicles.

FIG. 6 depicts the interaction of the "Bubbles of Vision" associated with two different vehicles 610A and 610B. Each vehicle has an associated inner Bubble of Vision 635A and 335B, outer Bubble of Vision 615A and 615B, and intermediate Bubble of Vision 625A and 625B. As a result of the overlapping Bubble of Vision, multiple views and prospective of an object can be measured. The multiple views and prospective of the same object may be used to further identify the object or to calibrate the sensors on a particular vehicle relative to another vehicle.

Figure 7:
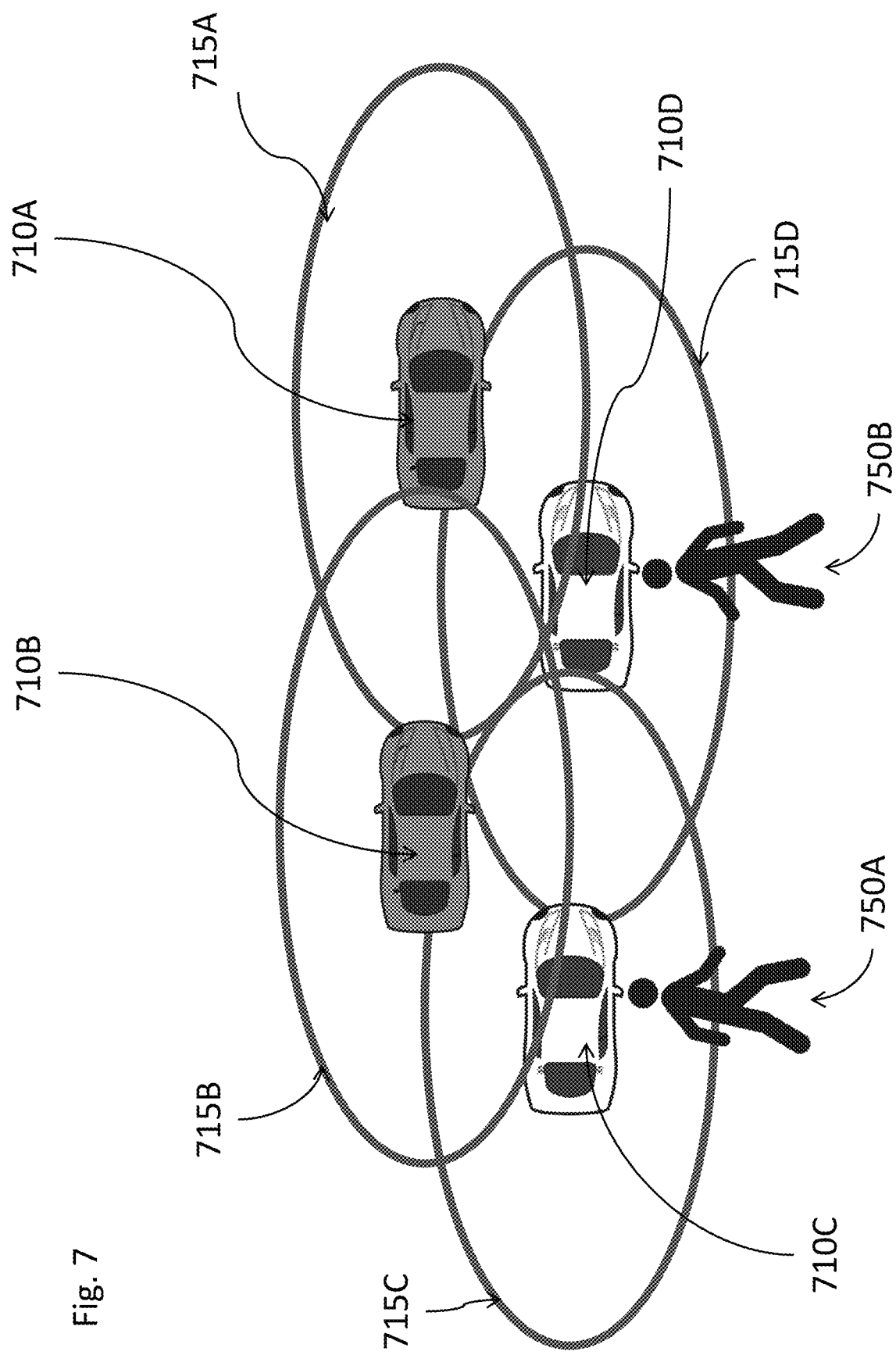
FIG. 7 is an illustration of normal pedestrian behavior.

FIG. 7 shows an illustration of normal pedestrian behavior. In this illustration, four vehicles 710A. 710B, 710C and 710D are depicted. Each vehicle includes an outer Bubble of Vision 715A, 715B, 715C and 715D, respectively. Pedestrian 750A is located within the Bubble of Vision 715C of vehicle 710C. Accordingly, in Step 410 the images acquired by the sensors will be determined to contain a pedestrian. In Step 415, pedestrian 750A's behavior would be analyzed and determined to be normal behavior because the pedestrian 750A is safely walking parallel to the flow of traffic. Similarly, pedestrian 750B is within the Bubble of Vision 715D of vehicle 710D. Again, since the pedestrian 750B is safely walking parallel to the flow of traffic, the pedestrian 750B would be determined to be displaying normal behavior in step 460. Since neither pedestrian 750A nor 750B is within vehicle 710A or 710B Bubble of Vision 715A and 715B respectively, in step 410, both vehicles would determine that no pedestrians were contained in the images, and no further processing was required and the images would be stored in the storage 320.

Figure 8:
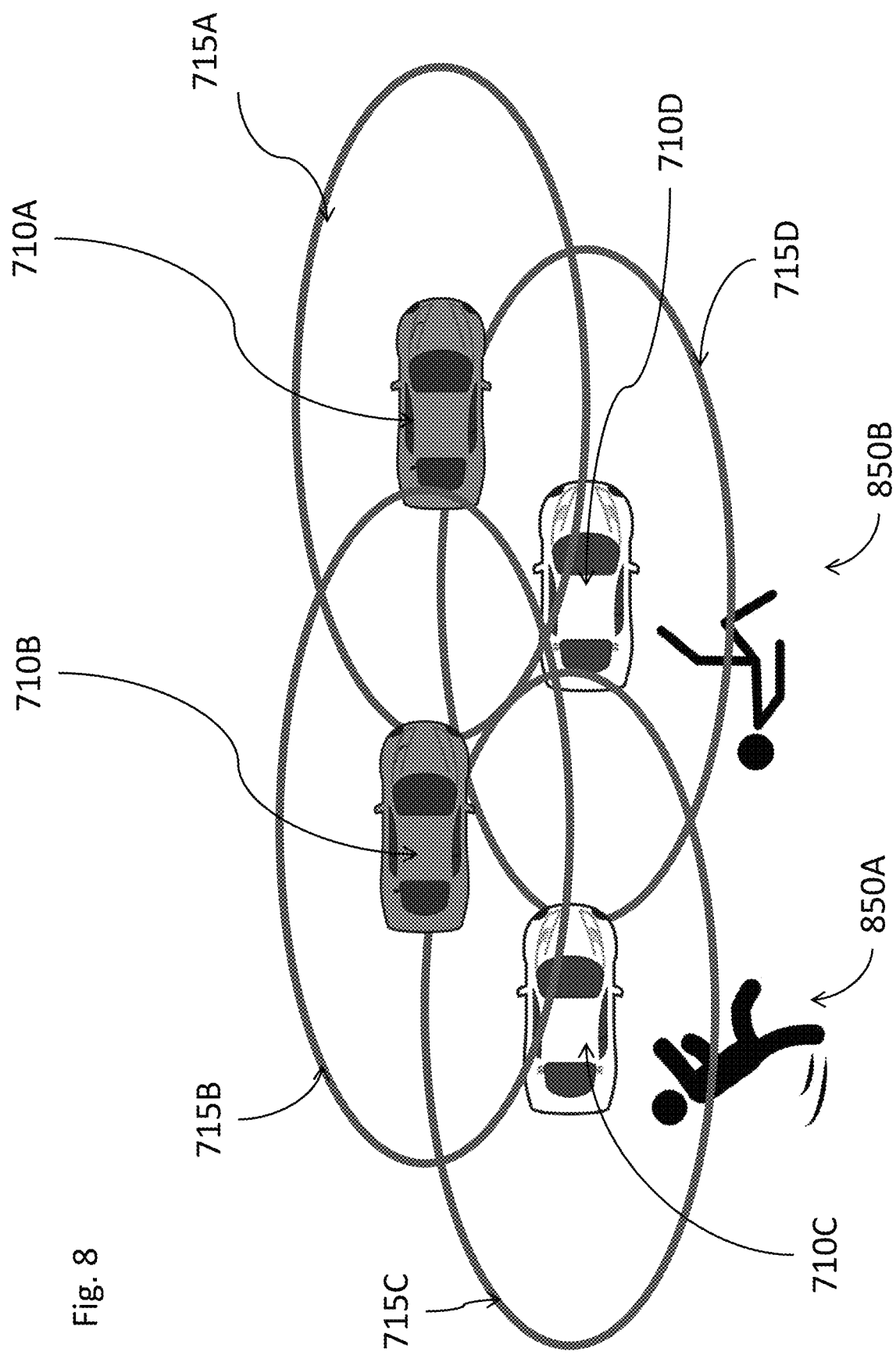
FIG. 8 is an illustration of injured pedestrian behavior.

The injured pedestrian behavior is illustrated in FIG. 8. In this illustration, pedestrian 850B is within Bubble of Vision 715D. Therefore, in Step 410 the images would be determined to contain a pedestrian. When the images were analyzed, the pedestrian 850B would be determined to be displaying injured behaviors using any one or combination of the methods previously described. Specifically, the pedestrian 850B is depicted as lying on the ground. This may have been caused by a traumatic medical event such as a heart attack, the result of a trip and fall, or as a result of an assault. As a result, vehicle 710D would alert the passengers of the vehicle (Step 455), transmit the data to server (Step 440), and alert emergency services (step 450).

Similarly, pedestrian 850A is depicted in the process of falling since pedestrian 850A is within the Bubble of Vision 715C. Accordingly, vehicle 710C would detect the pedestrian (step 410) and detect injured behavior (step 415) using any one or combination of the methods previously described alert the passengers of the vehicle (Step 455), transmits the data to server (Step 440) and alerts emergency services (step 450).

Figure 9:
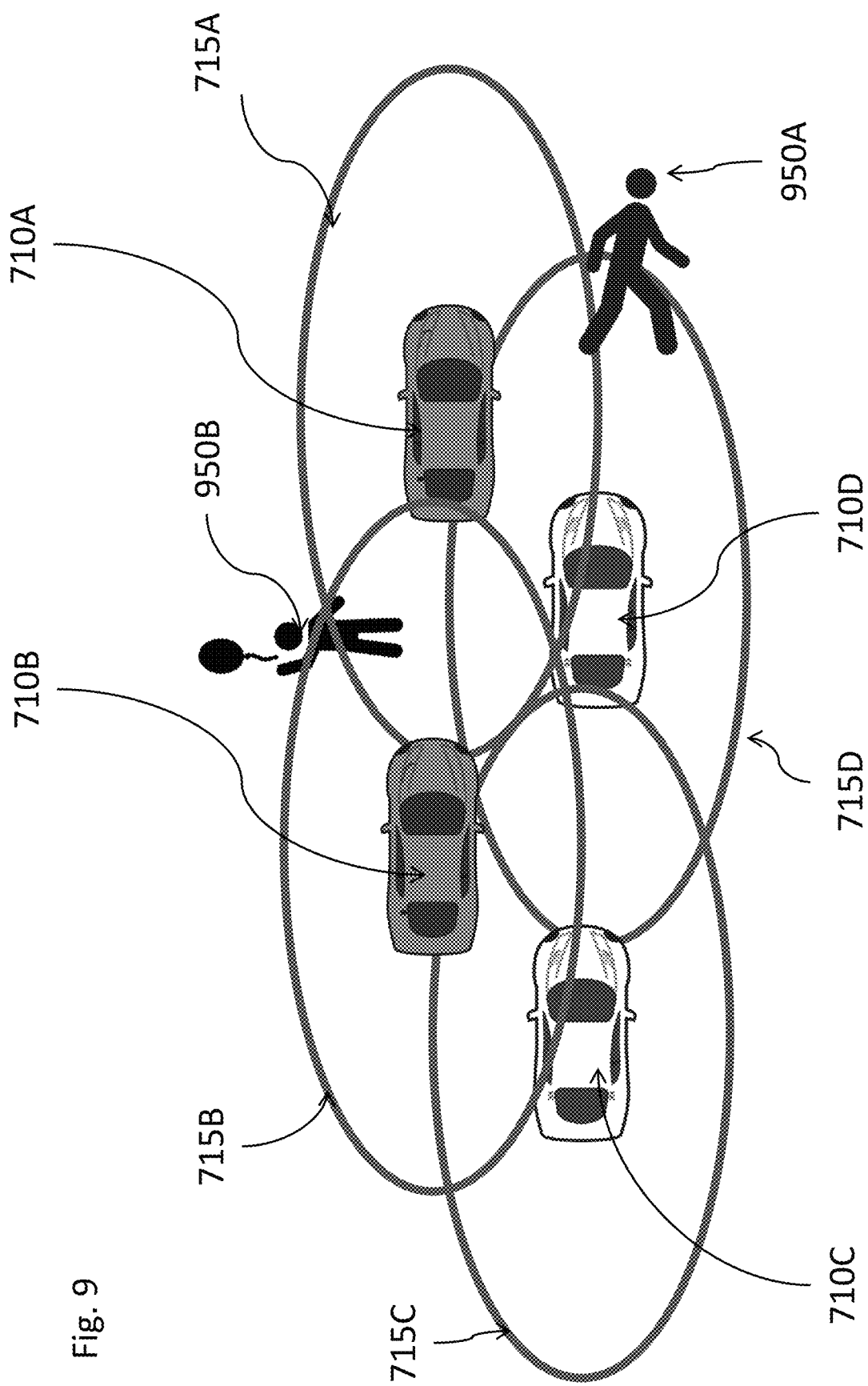
FIG. 9 is an illustration of hazardous pedestrian behavior.

In FIG. 9, examples of hazardous pedestrian behaviors are illustrated. In this illustration, pedestrian 850B is a small child playing with a balloon. The child is located within the Bubbles of Vision 715A and 715B. Accordingly, both vehicle 710A and 710B will detect a pedestrian (step 410), and hazardous pedestrian behavior would be determined (step 415) using any one or combination of the methods previously described. Pedestrian 850B would be determined to display hazardous behavior because 850B is a small child that is playing with a toy close to the passing vehicle. Therefore, as a result, vehicle 710D would alert the passengers of the vehicle (Step 455), transmit the data to server (Step 440), and alert emergency services (step 450).

Also shown in FIG. 9 is pedestrian 950A who is walking perpendicular to the flow of traffic and is, in fact, walking directly in front of vehicle 710D. As a result, vehicle 710D would determine that the acquired images contained a pedestrian (step 410) and that pedestrian 950A was displaying hazardous behaviors using any one or combination of the methods previously described. As a result, vehicle 710D would alert the passengers of the vehicle (Step 445), transmit the data to server (Step 440), and alert emergency services (step 450).

Figure 10:
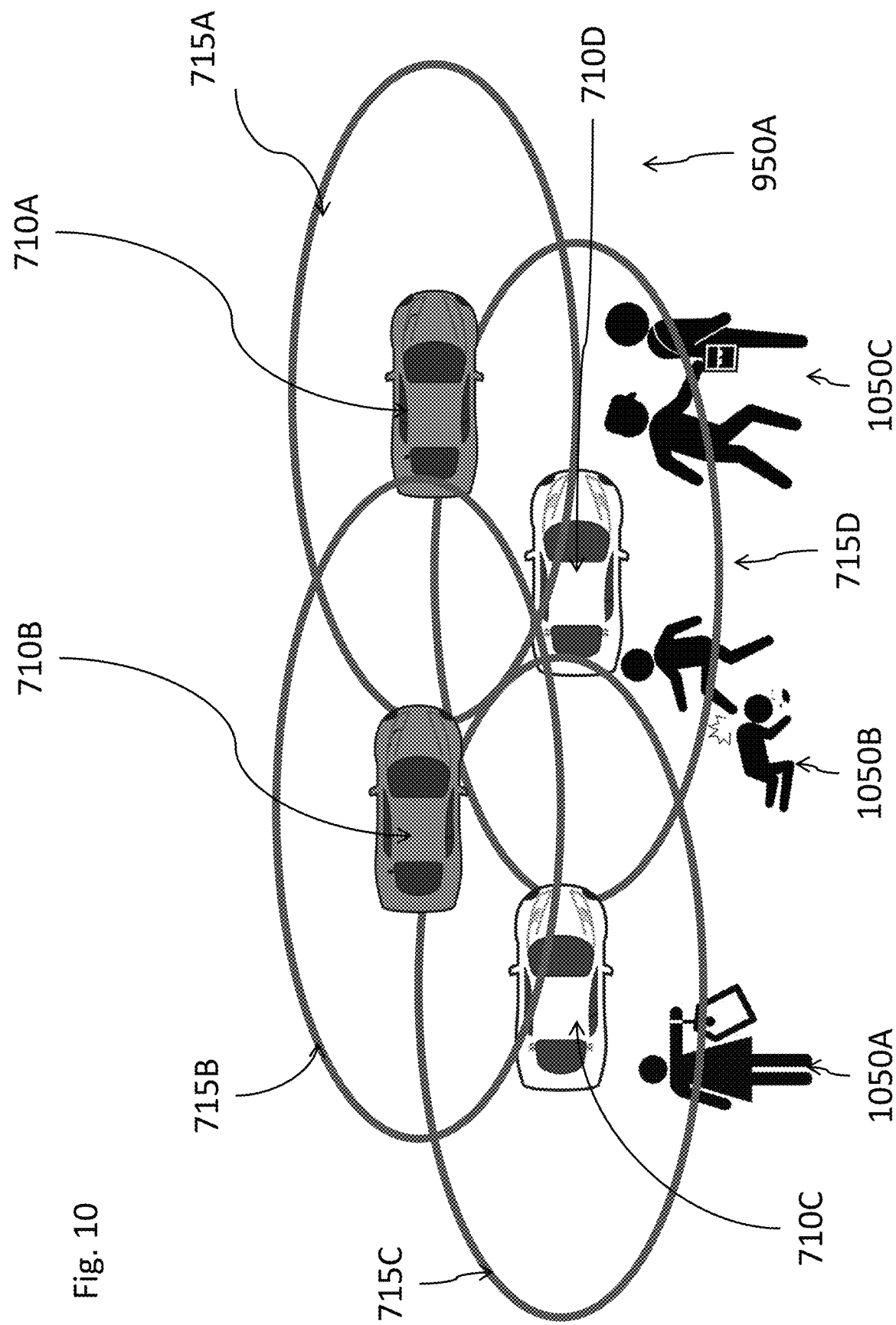
FIG. 10 is an illustration of criminal pedestrian behavior.

FIG. 10 shows an example of an illustration of criminal pedestrian behavior. Pedestrians 1050C are located inside of Bubble of Vision 715D. Therefore, vehicle 710D would determine that the acquired images contained pedestrians (step 410). The vehicle 710D would further determine that pedestrians 1050C are engaged in criminal behavior using any one or combination of the methods previously described. Specifically, the vehicle 710D would determine that pedestrians 1050C are engaged in a larceny, specifically a purse snatching. As a result, vehicle 710D would alert the passengers of the vehicle (Step 445), transmit the data to server (Step 440), and alert emergency services (step 450).

Vehicle 710D would also detect pedestrians 1050B when vehicle 710D analyzed pedestrians 1050B behavior as criminal using any one or combination of the methods previously described. Specifically, vehicle 710D would determine that pedestrians 1050B are engaged in an assault. Accordingly, vehicle 710D would alert the passengers of the vehicle (Step 435), transmit the data to server (Step 440), and alert emergency services (step 450).

Vehicle 710C would detect (step 410) pedestrian 1050A because the pedestrian 1050A is within Bubble of Vision 715C. The vehicle 710C would then analyze the pedestrians 1050A's behavior using any one or combination of the methods previously described and determine (Step 415) is consistent with illegal commercial transactions. For instance, 710C may be able to identify an illegal drug sale or prostitution. As a result, vehicle 710C would alert the passengers of the vehicle (Step 435), transmit the data to server (Step 440), and alert emergency services (step 450).

Figure 11:
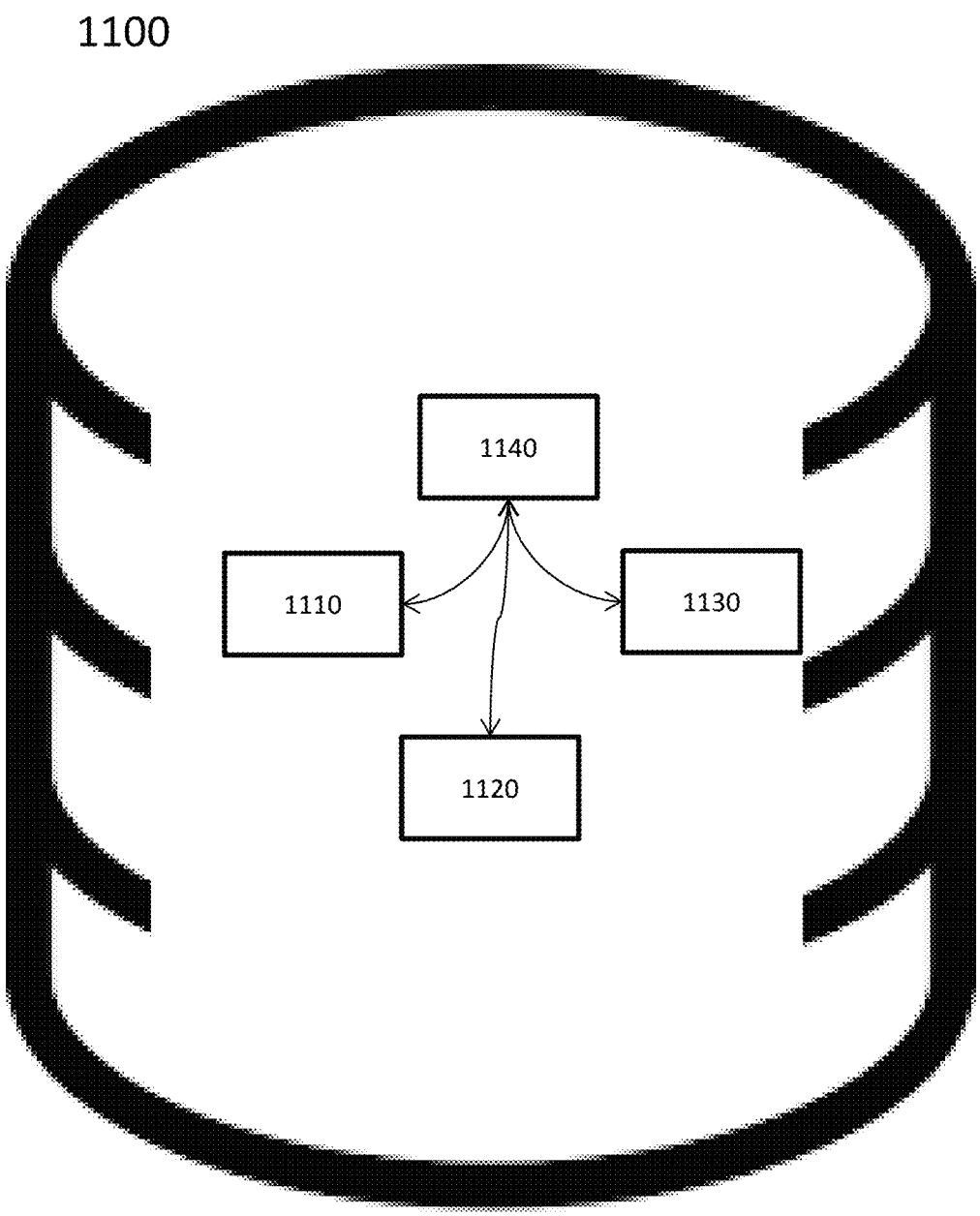
FIG. 11 is a block diagram of the database server.

FIG. 11 depicts the components of the database server 1100. The database server 1100 may include a memory 1110, a communication interface 1130, storage 1120 and a processor 1140. The processor 1140 is able to transmit and receive information from the Internet 100 via the communication interface 1130. In addition, the processor 1140 is able to store data received by the communication 1130.

FIG. 12 is a block diagram for the process implemented by the database server 1100 for monitoring pedestrians based on data acquired from the array of vehicles 110a . . . 110n. Data acquired from the plurality of when the data is received (1205) from the individual vehicles via the real time communication channel 105 and the short range communication channel 290. The data may include the raw data collected by the plurality of sensors 150, thermal images acquired by the thermal imager 210, high definition images captured by HD camera 220, geolocation data determined by the geo locating system 240 and data when the information was recorded. In addition, the data may include identifiers that identify which vehicle 110 from the array of vehicles 110a . . . 110n that acquired the data.

The received data is then aggregated (1210) based on the location where the data was collected and the time when it was collected. The aggregated data is then analyzed (1215) to determine if a predetermined pedestrian behavior is detected. In the event that the analysis reveals only normal pedestrian behavior, no further action is taken (1125). If the result of the analysis 1215 is that hazardous behavior is detected, such as jay walking pedestrians or children playing near the roadway, an alert is sent to emergency services 130. Emergency services may use this post hoc analysis to determine how to allocate policing resources to address the detected behavior.

Similarly, if the analysis 1215 using any one or combination of the methods previously described determines potentially criminal behavior, emergency services are alerted 1220. By aggregating the data over an extended period of time and from many vehicles, the database server 1100 may be able to identify criminal behaviors that an individual vehicle may miss. For instance, an individual standing on a street corner is not by itself suspicious. However, if that individual is observed standing on the same street corner by multiple vehicles over an extended period of time or in successive days, this behavior may be indicative of criminal activity.

If the analysis 1215 detects injured behavior based on the aggregated data, the database server 1100 still sends (1220) an alert to emergency services 130. The transmitted alert may be useful in determining the cause and potential liability for the injured pedestrian.

FIG. 13A depicts the thermal profile 1310 of pedestrians. This thermal profile may be used by the processor 300 to determine if the acquired image contains a pedestrian (step 410).

FIG. 13B depicts a kinematic model 1320 of a pedestrian. This kinematic model may be used by the processor 300 to determine if the acquired image contains a pedestrian (step 410).

Although features and elements are described above in particular combinations, one of ordinary skill in the art will appreciate that each feature or element can be used alone or in any combination with the other features and elements. In addition, any of the steps described above may be automatically performed by either the VC 300 or database server 1100.

Furthermore, the methods described herein may be implemented in a computer program, software, or firmware incorporated in a computer-readable medium for execution by a computer or processor. Examples of computer-readable media include electronic signals (transmitted over wired or wireless connections) and non-transitory computer-readable storage media. Examples of non-transitory computer-readable storage media include, but are not limited to, a read only memory (ROM), a random access memory (RAM), a register, cache memory, semiconductor memory devices, magnetic media, such as internal hard disks and removable disks, magneto-optical media, and optical media such as CD-ROM disks, and digital versatile disks (DVDs).

What is claimed is:
1. An apparatus of a vehicle for monitoring pedestrian health comprising:
　　one or more thermal imagers,
　　one or more high definition imagers,
　　a real time communication interface,
　　a short range communication interface, and
　　a vehicle computer communicatively coupled to the one or more thermal imagers, the one or more high definition imagers, the real time communication interface and the short range communication interface;

wherein the vehicle computer:
acquires a plurality of thermal images of a pedestrian sidewalk from the one or more thermal imagers as the vehicle is driving on a roadway located adjacent the pedestrian sidewalk,
acquires a plurality of high definition images of the pedestrian sidewalk from the one or more high definition imagers as the vehicle is driving on the roadway located adjacent the pedestrian sidewalk,
determines whether the plurality of thermal images and the plurality of high definition images contain one or more pedestrians on the pedestrian sidewalk,
determines, based on the plurality of thermal images and the plurality of high definition images containing the one or more pedestrians on the pedestrian sidewalk, whether a pedestrian of the one or more pedestrians who was previously walking on the pedestrian sidewalk is falling or lying on the pedestrian sidewalk and exhibiting an injured pedestrian behavior,
selectively displays an alert on a display communicatively coupled to the vehicle computer in response to determining that the pedestrian is falling or lying on the pedestrian sidewalk, and
selectively transmits via the real time interface the plurality of thermal images and the plurality of high definition images to a database server in response to determining that the pedestrian is falling or lying on the pedestrian sidewalk.

2. The apparatus of claim 1, wherein the vehicle computer further:
selectively transmits via the real time communication interface the plurality of thermal images and the plurality of high definition images along with an alert to emergency services, wherein the alert includes one or more of time, location, and an identification of the injured pedestrian.

3. The apparatus of claim 1, wherein the vehicle computer further:
when the plurality of thermal images and the plurality of high definition images are determined to contain the one or more pedestrians, analyzes the plurality of thermal images and the plurality of high definition images to determine if the one or more pedestrians are displaying a predetermined pedestrian behavior indicating the one or more pedestrians have an elevated thermal profile.

4. The apparatus of claim 3, wherein the injured pedestrian behavior is associated with a criminal activity.

5. The apparatus of claim 1, wherein the vehicle computer further:
determines, based on the plurality of thermal images, a thermal profile of the pedestrian, and
determines, based on the thermal profile of the pedestrian, that the pedestrian is having a heart attack.

6. The apparatus of claim 1, wherein
determining whether the plurality of thermal images and the plurality of high definition images contain one or more pedestrians on the pedestrian sidewalk further comprises determining whether a moving object on the pedestrian sidewalk has a kinematic profile that corresponds to a pedestrian movement associated with the one or more pedestrians.

7. A method for monitoring pedestrian health comprising:
acquiring, by a vehicle computer of a vehicle, a plurality of thermal images of a pedestrian sidewalk from one or more thermal imagers as the vehicle is driving on a roadway located adjacent the pedestrian sidewalk;
acquiring, by the vehicle computer, a plurality of high definition images of the pedestrian sidewalk from one or more high definition imagers as the vehicle is driving on the roadway located adjacent the pedestrian sidewalk,
determining, by the vehicle computer, whether the plurality of thermal images and the plurality of high definition images contain one or more pedestrians on the pedestrian sidewalk,
determining, based on the plurality of thermal images and the plurality of high definition images contain the one or more pedestrians on the pedestrian sidewalk, whether a pedestrian of the one or more pedestrians who was previously walking on the pedestrian sidewalk is falling or lying on the pedestrian sidewalk and exhibiting an injured pedestrian behavior,
selectively displaying, by the vehicle computer, an alert on a display communicatively coupled to the vehicle computer in response to determining the pedestrian is falling or lying on the pedestrian sidewalk; and
selectively transmitting, via a real time interface of the vehicle computer, the plurality of thermal images and the plurality of high definition images to a database server in response to determining that the pedestrian is falling or lying on the pedestrian sidewalk.

8. The method of claim 7, further comprising:
selectively transmitting, via the real time communication interface of the vehicle computer, the plurality of thermal images and the plurality of high definition images along with an alert to emergency services, wherein the alert includes one or more of time, location, and an identification of the injured pedestrian behavior.

9. The method of claim 7, further comprising:
when the plurality of thermal images and the plurality of high definition images are determined to contain the one or more pedestrians, analyzing, by the vehicle computer, the plurality of thermal images and the plurality of high definition images to determine if the one or more pedestrians are displaying a predetermined pedestrian behavior indicating the one or more pedestrians have an elevated thermal profile.

10. The method of claim 9, wherein the injured pedestrian behavior is associated with a criminal activity.

11. The method of claim 7, further comprising:
determining, by the vehicle computer and based on the plurality of thermal images a thermal signature of the pedestrian, and
determining, based on the thermal signature of the pedestrian, that the pedestrian is having a heart attack.

12. The method of claim 7, wherein
determining whether the plurality of thermal images and the plurality of high definition images contain one or more pedestrians on the pedestrian sidewalk further comprises determining whether a moving object on the pedestrian sidewalk has a kinematic profile that corresponds to a pedestrian movement associated with the one or more pedestrians.

* * * * *

UNITED STATES PATENT AND TRADEMARK OFFICE
CERTIFICATE OF CORRECTION

PATENT NO. : 10,694,357 B2
APPLICATION NO. : 15/366623
DATED : June 23, 2020
INVENTOR(S) : Austin Newman It is certified that error appears in the above-identified patent and that said Letters Patent is hereby corrected as shown below:

In the Claims

Claim 2, Column 9, Line 37, after "pedestrian" insert --behavior-- therein.

Signed and Sealed this
Eleventh Day of August, 2020

Andrei Iancu
*Director of the United States Patent and Trademark Office*